United States Patent
Yabe

(10) Patent No.: US 6,895,334 B2
(45) Date of Patent: May 17, 2005

(54) METHOD AND APPARATUS FOR OPTIMIZING OPTICAL SYSTEM AND RECORDING MEDIUM WITH PROGRAM FOR OPTIMIZING OPTICAL SYSTEM

(75) Inventor: Akira Yabe, Omiya (JP)

(73) Assignee: Fujinon Corporation, Saitama (JP)

( * ) Notice: Subject to any disclaimer, the term of this patent is extended or adjusted under 35 U.S.C. 154(b) by 794 days.

(21) Appl. No.: 09/778,172

(22) Filed: Feb. 7, 2001

(65) Prior Publication Data

US 2002/0052722 A1 May 2, 2002

(30) Foreign Application Priority Data

Nov. 2, 2000 (JP) ........................................ 2000-335631

(51) Int. Cl.[7] .............................................. G06F 17/10
(52) U.S. Cl. .................... 702/2; 703/6; 703/7; 700/36; 359/563; 359/637
(58) Field of Search .......................... 703/2, 6; 700/36; 359/563, 637

(56) References Cited

U.S. PATENT DOCUMENTS

| | | | | |
|---|---|---|---|---|
| 5,067,067 A | * | 11/1991 | Estelle et al. ................. | 700/36 |
| 5,786,940 A | * | 7/1998 | Robb ........................ | 359/637 |
| 6,166,862 A | * | 12/2000 | Hashimura et al. ......... | 359/652 |
| 6,567,226 B2 | * | 5/2003 | Fuse .......................... | 359/563 |
| 6,655,803 B1 | * | 12/2003 | Rubinstein et al. ......... | 351/177 |

OTHER PUBLICATIONS

"Fast Image–quality–based optimization of optical system", S.J. Dobson, Applied Optics, vol. 37, No. 34, Dec. 1998.*
"Design of a diluted aperture by use of the practical cutoff frequency", J.L. Flores, Applied Optics, vol. 38, No. 38, Dec. 1999.*
"Automatic Optical Design with ACCOS V Program", M. Amon, Martin Marietta Corp. IEEE 1989.*
"Wavefront quality of optimized lenses", H. Haidner, Pure Appl. Opt. 6, pp. 191–202, 1997 IOP Publishing.*

* cited by examiner

*Primary Examiner*—Jean Homere
*Assistant Examiner*—Fred Ferris
(74) *Attorney, Agent, or Firm*—Frommer Lawrence & Haug LLP; Matthew K. Ryan

(57) ABSTRACT

Optical properties with high non-linearity such as a modulation transfer function (MTF) are efficiently optimized at high speed compared to conventional methods. An optimal solution of an optical system is obtained in a first optimization unit using a merit function on aberration. Weights or target values of the merit function on aberration is automatically adjusted in a second optimization unit in a manner that an evaluated value of the MTF or the like approaches a desired value. The first optimization unit re-optimizes the optical system using the weights or target values which have been automatically adjusted. Thus, automated is a function equivalent to the operation which has been conducted by a designer such as adjustment to weights or target values.

17 Claims, 24 Drawing Sheets

| Lens data at starting point ||||| 
|---|---|---|---|---|
| S i (Surface No.) | R i (Radius of curvature) | D i (Surface separation) | N d i (Refractive index) | ν d i (Abbe's No.) |
| 1 | 13.1502 | 2.0817 | 1.60800 | 56.5 |
| 2 | -128.4561 | 1.4724 | | |
| 3 | -30.7685 | 0.8631 | 1.56000 | 45.3 |
| 4 | 11.9825 | 4.0111 | | |
| 5 | -73.1134 | 0.8631 | 1.56000 | 45.3 |
| 6 | 12.6425 | 2.5894 | 1.61600 | 55.0 |
| 7 | -20.0046 | 0.0000 | | |

FIG. 5

| Design condition ||
|---|---|
| Focal length f | 50mm |
| Fno. | 4.0 |
| Location of object point | infinite |
| Half field angle ω | 20° |
| Sample object point | center, half field angle of 14° half field angle of 20° |
| Evaluation frequency for MTF | 40cs/mm |
| Sample wavelength | 435.8nm, 546.1nm, 656.3nm |
| Weight for wavelength | 1 , 1 , 1 |
| Distortion | within 1% |
| Vignetting | none |

FIG. 6

| Target value for MTF | | | | |
|---|---|---|---|---|
| Field angle | Target 1 | | Target 2 | |
| | S direction | T direction | S direction | T direction |
| Center | 65% | | 57% | |
| 14° | 55% | 65% | 57% | 65% |
| 20° | 55% | 65% | 57% | 65% |

FIG. 7

| Result with Target 1 | | | | | | |
|---|---|---|---|---|---|---|
| Field angle | MTF | | Adjustment ratio of weight | | Target value for mean of longitudinal aberrations (μm) | |
| | S direction | T direction | S direction | T direction | S direction | T direction |
| Center | 64% | | 1.2 | | 13.6 | |
| 14° | 55% | 64% | 1.5 | 1.1 | 11.7 | -12.4 |
| 20° | 54% | 64% | 0.7 | 1.8 | -11.6 | -34.2 |

FIG. 8

| Result with Target 2 | | | | | | |
|---|---|---|---|---|---|---|
| Field angle | MTF | | Adjudtment ratio of weight | | Target value for mean of longitudinal aberrations (μm) | |
| | S direction | T direction | S direction | T direction | S direction | T direction |
| Center | 56% | | 1.0 | | 15.3 | |
| 14° | 57% | 65% | 1.5 | 0.9 | 16.0 | -10.7 |
| 20° | 57% | 64% | 0.8 | 1.5 | -10.8 | -34.0 |

FIG. 9

| Lens data of solution with Target 1 ||||||
|---|---|---|---|---|
| S i (Surface No.) | R i (Radius of curvature) | D i (Surface separation) | N d i (Refractive index) | ν d i (Abbe's No.) |
| 1 | 18.9178 | 5.9592 | 1.79080 | 48.9 |
| 2 | 48.4813 | 2.0454 | | |
| 3 | -56.2882 | 2.0000 | 1.66405 | 32.6 |
| 4 | 17.1377 | 2.3758 | | |
| 5 | 120.5964 | 2.0710 | 1.57937 | 40.1 |
| 6 | 20.0136 | 3.8850 | 1.80000 | 48.0 |
| 7 | -34.3802 | 0.0000 | | |

FIG. 10

| Lens data of solution with Target 2 ||||||
|---|---|---|---|---|
| S i (Surface No.) | R i (Radius of curvature) | D i (Surface separation) | N d i (Refractive index) | ν d i (Abbe's No.) |
| 1 | 18.4608 | 4.5462 | 1.80000 | 48.0 |
| 2 | 59.1162 | 2.3640 | | |
| 3 | -69.4418 | 2.0000 | 1.67159 | 32.1 |
| 4 | 16.3997 | 2.8414 | | |
| 5 | 294.9039 | 2.2763 | 1.57555 | 40.8 |
| 6 | 20.8082 | 3.9552 | 1.80000 | 48.0 |
| 7 | -35.6773 | 0.0000 | | |

FIG. 11

| Target value for MTF | | |
|---|---|---|
| Field angle | Target | |
| | S direction | T direction |
| Center | 65% | |
| 14° | 55% | 65% |
| 20° | 60% | 65% |

FIG. 18

| Solution No. | Value of merit function | |
|---|---|---|
| | Aberration | M T F |
| 1 | 0.001598 | 10.3% |
| 2 | 0.001543 | 10.7% |
| 3 | 0.001539 | 2.7% |
| 4 | 0.001549 | 7.7% |
| 5 | 0.001539 | 6.5% |

FIG. 19

| Lens data of solution No.3 | | | | |
|---|---|---|---|---|
| S i (Surface No.) | R i (Radius of curvature) | D i (Surface separation) | N d i (Refractive index) | ν d i (Abbe's No.) |
| 1 | 19.8762 | 5.4071 | 1.80000 | 43.8 |
| 2 | -282.4339 | 1.6230 | | |
| 3 | -43.4813 | 2.0000 | 1.72558 | 30.2 |
| 4 | 16.8887 | 3.6591 | | |
| 5 | -127.0678 | 2.0000 | 1.67193 | 44.0 |
| 6 | 19.2644 | 5.2366 | 1.80000 | 48.0 |
| 7 | -28.2142 | 0.0000 | | |

FIG. 20

METHOD AND APPARATUS FOR OPTIMIZING OPTICAL SYSTEM AND RECORDING MEDIUM WITH PROGRAM FOR OPTIMIZING OPTICAL SYSTEM

BACKGROUND OF THE INVENTION

1. Field of the Invention

The present invention relates to a method of optimizing an optical system which realizes automated design of an optical system, an apparatus for optimizing an optical system and a recording medium on which a program for optimizing an optical system is recorded.

2. Description of the Related Art

In recent years, it has been common to employ automated design using a computer for design of optical systems (simply referred to as "optical design" hereinafter). The automated optical design is realized by executing a design program on a computer. Thus, in performing the automated optical design, use of excellent design programs is an important factor to realize favorable optical design.

Optical design is an operation to optimize design parameters of an optical system so that the optical system offers desired optical performance. The basic concept of the optimization of an optical system will be described herein below. Although the "optical system" denotes a system including at least one optical element such as a lens or a mirror, described hereinafter is a case where the optical system comprises only lenses, for a simple description. However, an optical design including other optical elements than the lens is realized basically in the same manner as the lens design described below.

In the field of lens design, various numeric values indicating the configuration of a lens such as curvature of each lens surface, surface separation, refractive index of glass, dispersion, aspheric surface coefficient are called parameters. At least one of optical characteristics of a lens such as paraxial amounts (focal length, back focus and the like), aberration and lens shape is considered to evaluate the lens performance and a target value is set for each of evaluation subjects (i.e., optical characteristics to be evaluated). These parameters are changed in such a manner that the evaluated value of each optical characteristic becomes as close to the given target value as possible.

In the field of lens design, a function for evaluation of lenses is generally called "merit function" (or evaluation function). The merit function is a sum total of functions represented by $w_i^*(f_i-t_i)^2$ of all evaluation subjects. In the $w_i^*(f_i-t_i)^2$, '$f_i$' means a temporary characteristic value (evaluated value) of the ith evaluation subject ($i$ represents an integer greater than or equal to 1); '$t_i$' means a target value of the $i$th evaluation subject; '$w_i$' means a weight value of the $i$th subject; and '*' means multiplication. To obtain the parameter values that make the merit function the minimum is the essential operation of the automated lens design. There are many algorithms for minimizing the merit function such as a damped least squares (DLS) method and a quasi-Newton method. It is ideal that all evaluation values $f_i$ is equal to the target values $t_i$, but practically it is not always. When all evaluation values do not correspond to the target value $t_i$, varying balance between each weight $w_i$ corresponding to each target value $t_i$ changes in turn the minimum of the merit function. Operation to seek the minimum point of the merit function by varying parameters is generally called "lens optimization".

When designing lenses, design conditions such as paraxial amounts, e.g., focal length and back focus, lens shape, e.g., length or diameter of lens, tolerance level of distortion are required to be set identical to specifications. The specifications are given as a specific value or a value with a tolerance to a degree. Here, the design condition in which values are identical to the specification is called "constraint". The optimal point within a parameter space in lens optimization is formulated to be the minimum of the merit function under the conditions where all constraints are identical to the specifications.

It is necessary for lenses to have preferable performance in image formation. For instance, an image pickup lens has to have preferable image formation performance within the range to be used of an object distance and the size of the screen. Especially, when the image pickup lens is a zoom lens, preferable image formation performance should be ensured within the range of an object distance and the size of the screen over the whole zooming range. In the design of such a lens, first of all, several typical zoom points are selected in the zooming range and optical performance at each of the zoom points is subject to optimization. Then, several typical object distances at each zoom point are selected and several typical points are further selected on the object plane. Thus, the zoom lens is comprehensively optimized as to the state of image formation on the image plane, the image formation being performed by rays from a plurality of sample object points, the rays being sampled over several zoom points and object distances. Although the image pickup lens having a zoom function has been described above as an example, the above-mentioned process is not limited to this particular lens. General operation of the lens design is an optimization of image formation on the image plane of one or more of sample object points selected in accordance with a particular application of a lens.

Typical optical properties used in the evaluation of lens performance will be now described. In an optical system, a light from an object point passes through a lens and the like and reaches on the image plane in the form of a spread flux. The flux reached on the image plane forms intensity distribution thereon in accordance with the properties of the optical system, which is called a point spread function (PSF). In a preferable state of image formation, the PSF takes a value other than zero in a very small range. Fourier transform of the PSF on condition that integration of intensity over the whole of image plane is normalized as '1' is called an optical transfer function (OTF). The OTF is a complex function in a two dimensional frequency space. The absolute value of the OTF is called a modulation transfer function (MTF). The MTF takes on values between 0 and 1 and always 1 at the origin of the frequency space. The bigger the value of the MTF is, the better the image formation of the optical system is. The target in a lens performance is often set using the MTF. The MTF is generally evaluated in respect to a sagittal direction (S direction) and a tangential (or meridional) direction (T direction). Here, S direction denotes a direction vertical to a meridional plane, while T direction denotes a direction included in the meridional plane. The "meridional plane" denotes a plane including both an axis of symmetry and an object point in an axisymmetric lens when the object point is not on the axis of symmetry.

Several sample rays are selected from a flux reaching from the object point to the image plane and positions of these rays on the image plane are plotted, and a thus formed diagram is called a spot diagram. The more these rays are converged on one point, the better image formation of the optical system is. Two axes orthogonal to each other on the image plane are designated as an X coordinate axis and a Y coordinate axis. $X_i$ and $Y_i$ are coordinates of the $i$th sample ray on the image plane, and $X_m$ and $Y_m$ are the mean of coordinates $X_i$ and $Y_i$ over all sample rays, respectively. Root of mean of $(X_i-X_m)^2+(Y_i-Y_m)^2$ over '$i$' is called a root mean square (RMS) spot size. The RMS spot size is a numeric value showing a state how rays are converged. When the value is small, the spread of the PSF is small. When the light source is not a monochromatic light, several sample wavelengths are chosen, and ray tracing for each sample wavelength is conducted, in general.

A ray with a standard wavelength passing through the center of the stop of an optical system is called a "principal ray". When $X_c$ and $Y_c$ are coordinates on the image plane of the principal ray and $X_i$ and $Y_i$ are coordinates on the image plane of the $i$th sample ray, $X_i-X_c$ and $Y_i-Y_c$ are called "transverse aberration" of the sample ray when taking the principal ray as a reference. This transverse aberration is a typical subject of the performance evaluation in the automated lens design. In one typical example of the merit function, the transverse aberration with regard to all sample rays from all sample object points is subjected to evaluate the performance. In the case where transverse aberration is the evaluation subject in the merit function, the simplest setting for the target value and weight is to set the target value to '0' and the weight to '1' with respect to X components and Y components of all sample rays from all sample object points. Considering that there is not much differences between the coordinates $X_c$ and $Y_c$ of the principle ray and the mean coordinates $X_m$ and $Y_m$ of all sample rays, the merit function on transverse aberration corresponds to a merit function acquired by summing root squares of the RMS spot size over all sample objects. In the automated lens design, the target value of transverse aberration of all sample rays is, however, not necessarily to be the same. The same weight also does not need to be set with respect to all sample rays. The target value and weight can be arbitrarily set with respect to each sample ray. When the target value and weight of each sample rays are changed, an optimal solution of the automated design changes.

In addition to the aberration described above, other examples of lens aberration are transverse aberration taking a paraxial image point as a reference, wavefront aberration, spherical aberration, curvature of field by a principal ray and the like. Use of these aberrations as the evaluation subject in the merit function is effective to optimize the image formation.

Meanwhile, in the automated lens design using the merit function in view of only general aberration, although the optimal solution is effective for the evaluation of aberration, other optical performance such as an evaluation of the MTF is not always optimized. When values of the MTF is given as a target of lens performance, lens optimization may be performed using the merit function on the MTF. However, there exist the following problems in that case.

The MTF has higher non-linearity with parameters than that of aberration, thus it is difficult to optimize lenses effectively as compared to the case where aberration is subjected to be evaluated. It is apparent that the MTF has high non-linearity from the fact that the MTF takes on values only between 0 and 1. Meanwhile, since a greater value of the MTF is preferable, it is natural to set the design target to maximize a value obtained by summing all MTF values as the performance objective (e.g., a value obtained by summing all MTF values at each field angle). In this case, the merit function subjected to be maximized is a linear combination on the MTF. However, conventional algorithms for optimization such as a DLS method are assumed to be used on an evaluation subject with low non-linearity such as aberration, and objective thereof is to minimize the sum total of squares of the differences between the evaluated values and the target values. Thus, the conventional algorithms for lens optimization are inappropriate for optimization on the evaluation subject having high non-linearity such as the MTF. As described above, with conventional optimization techniques, it is difficult to efficiently realize lens optimization on the MTF.

There is another problem such that calculation for the MTF takes longer ti me than that for aberration. When optimization with aberration as the evaluation target is performed, the number of sample rays at one sample object point is about 10 to 20. To calculate the MTF with practical accuracy, however, at least more than 100 of rays have to be traced at one sample object point. Further, a process for obtaining the MTF from the result of ray tracing is complicated compared to that for obtaining aberration, resulting in requiring further longer time. As described above, it is apparent that lens optimization on the MTF takes long time.

As described above, lens optimization method using the merit function on the MTF has various problems. Therefore, practically repetition of the following operation is common in lens design. First, an optimal solution of the lens on aberration is obtained. Then, the MTF is evaluated with regard to the optimal solution. A designer adjusts weights and target values on aberration in order to obtain better values of the MTF and re-optimizes the lens design on aberration. This series of steps is repeated. In such a lens design, however, manual work by a designer is required, so that high-speed calculation by a computer, which is an advantage of the automated design, cannot be fully utilized. Adjusting weights or target values for aberration to obtain a preferable MTF values needs experiences of a designer. Therefore, it is considered that if the function equivalent to the operation of manually adjusting weights or target values by a designer is automated, efficient and high-speed lens design can be realized for the purpose of optimizing the lens on the MTF.

This invention is achieved with a view of above problems. It is an object of the invention to provide a method of optimizing an optical system in which optical properties with high non-linearity such as the MTF are optimized at high speed compared to conventional methods, an apparatus for optimizing an optical system and a recording medium on which an optimization program of an optical system is recorded.

SUMMARY OF THE INVENTION

A method of optimizing an optical system of the invention includes a step of optimizing an optical system as a subject of design in a manner that a value of a first optical property approaches a target value on the basis of a first function for optimization in which the target value of the first optical property including at least an aberration is set; a step of automatically adjusting the first function for optimization in a manner that a value of second optical property approaches a desired target value of the second optical property on the basis of an evaluation result of the optical system on the second optical property, the second optical property having relatively high non-linearity with design parameters of the optical system compared to the first optical property; and a step of re-optimizing the optical system which has been optimized on the basis of the first function automatically adjusted.

A method of optimizing an optical system of the invention may further include a step of evaluating the optical system as a subject of design on the first optical property prior to the step of optimizing the optical system, and in the step of optimizing the optical system, optimization of the optical system may be performed on the basis of the first evaluation result and the first function.

An apparatus for optimizing an optical system of the invention comprises optimization means for optimizing an optical system as a subject of design in a manner that a value of a first optical property approaches a target value on the basis of a function for optimization in which a target value of the first optical property including at least an aberration is set,; adjusting means for automatically adjusting the function for optimization in a manner that a value of second optical property approaches a desired target value of the second optical property on the basis of an evaluation result of the optical system on the second optical property, the second optical property having relatively high non-linearity with design parameters of the optical system compared to the first optical property; and control means for controlling the optimization means in a manner that re-optimization is performed on the optical system which has been optimized on the basis of the function for optimization automatically adjusted.

An apparatus for optimizing an optical system of the invention may include a first evaluation means for evaluating the optical system as a subject of design on the first optical property prior to the optimization by the optimization means, and the optimization means performs optimization of the optical system on the basis of the first evaluation result and the function for optimization.

On a recording medium of the invention, the optimization program allowing a computer to process each step in the above-mentioned method of optimizing an optical system is recorded.

In the method of optimizing an optical system of the invention, the first optical property may have a weight in the first function.

In the method of optimizing an optical system of the invention, the step of automatically adjusting the first function may include a process of automatically adjusting the first function on the basis of the second evaluation result and the second function for optimization in which the desired target value of the second optical property is considered.

In the method of optimizing an optical system of the invention, the second optical property may include a modulations transfer function (MTF), for example.

In the a method of optimizing an optical system of the invention, in the first function, the first optical properties may be considered on each of a plurality of sample object points set in different positions and the automated adjustment of the first function may include a process of relatively adjusting the values of the weights. At this time, the automated adjustment of the first function may include a process of adjusting the values of the weights for each of the two coordinate components on each sample object point, the two coordinate components being orthogonal to each other. Here, the two coordinate components orthogonal to each other denote components of the X coordinate and the Y coordinate orthogonal to each other set on the image plane, for example.

According to a method of optimizing an optical system of the invention, in the first function, the first optical properties are considered on each of a plurality of different sample rays from one sample object point and the automated adjustment of the first function includes a process of relatively adjusting the values of the weights, for example. At this time, the automated adjustment of the first function may further include a process of adjusting the values of the weights for each of the two coordinate components of each sample object ray, the two coordinate components being orthogonal to each other. Here, the two components orthogonal to each other denote components of the X coordinate and the Y coordinate orthogonal to each other set on the image plane, for example.

According to a method of optimizing an optical system of the invention, the first optical properties include an optical property for controlling a peak position, the optical property contributing to a peak position control of the MTF, and the automated adjustment of the first function includes a process of adjusting a function on the optical property for controlling the peak position in a manner that the MTF approaches a desired target value. Here, the functions describing optical properties for controlling the peak position includes a function on curvature of field of a principal ray, a function on the mean of longitudinal aberrations and a function on the minimum of square spot size, for example.

A method of optimizing an optical system of the invention is applicable to a so-called global optimization. When the method of optimizing an optical system is applied to the global optimization, in the step of optimizing an optical system, a plurality of local optimal solutions are obtained by performing global optimization; in the process of evaluating the optical system on second optical property, evaluation of each of one or more of a plurality of optical systems described by the plurality of local optimal solutions is performed; in the step of automatically adjusting the first function, the first function is automatically adjusted for each of the one or more of the optical systems performed in a manner that the value of the second optical property approaches a desired target value; and in the step of re-performing optimization, each of the one or more of the optical systems is re-optimized. As described, at least one cycle of optimization and automated adjustment is performed after the global optimization.

In the method of optimizing an optical system, the apparatus for an optical system and the recording medium on which an optimization program of the optical system is recorded, optimization of the optical system as a subject of design is performed in a manner that the value of the first optical property approaches the target value on the basis of the function for optimization (First function) in which the target value for the first optical property including at least an aberration is set. Subsequently, the function for optimization is automatically adjusted in a manner that the value of the second optical property approaches the desired target value of the second optical property on the basis of the evaluation result of the second optical property having relatively high non-linearity with design parameters of the optical system compared to the first optical property. Then, optimization is performed again on the optical system which has been optimized on the basis of the function for optimization automatically adjusted. At least one cycle of the aforementioned automated adjustment and optimization is performed.

In the present invention, "optical system" denotes an optical system comprising at least one optical element such as lens or mirror and wherein obtained is a desired optical image utilizing refraction or reflection of rays by the optical element.

Other and further objects, features and advantages of the invention will appear more fully from the following description.

BRIEF DESCRIPTION OF THE DRAWINGS

FIG. 5 is a table containing specific lens data of the lens shown in FIG. 4;

FIG. 6 is a table containing design conditions for the lens shown in FIG. 4;

FIG. 7 is a table containing setting for target values of a particular MTF used in the lens optimization in the first embodiment of the present invention;

FIG. 8 is a table containing results of optimization using the first target values shown in FIG. 7;

FIG. 9 is a table containing results of optimization using the second target values shown in FIG. 7;

FIG. 10 is a table containing lens data obtained in the optimization using the first target values shown in FIG. 7;

FIG. 11 is a table containing lens data obtained in the optimization using the second target values shown in FIG. 7;

FIG. 18 is a table containing setting for target values of a particular MTF used in lens optimization in the second embodiment of the present invention;

FIG. 19 is a table containing values of the merit function obtained when lens optimization according to the second embodiment of the present invention is performed using the target values in FIG. 18;

FIG. 20 is a table containing lens data of the third solution in FIG. 19;

DETAILED DESCRIPTION OF THE PREFERRED EMBODIMENTS

Embodiments of the present invention will be described below in detail with reference to accompanying drawings.

[First Embodiment]

Figure 1:
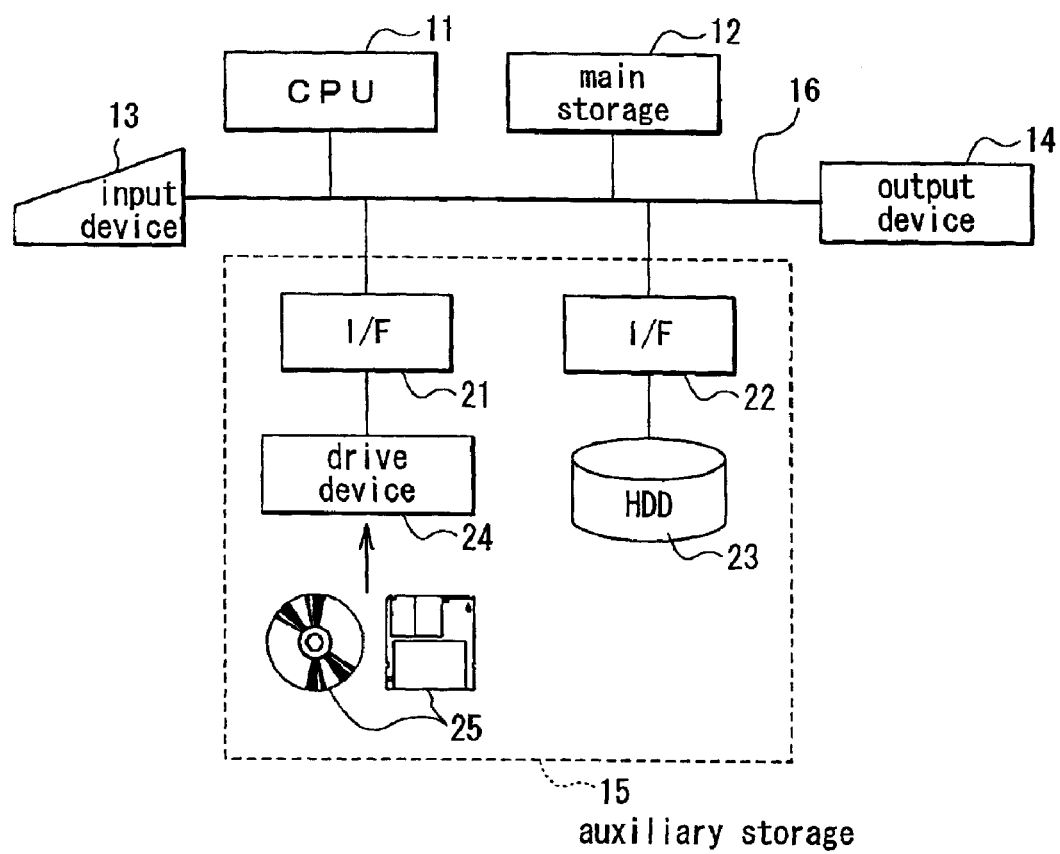
FIG. 1 is a block diagram showing the configuration of hardware of an apparatus for optimizing an optical system according to a first embodiment of the present invention.

FIG. 1 shows the configuration of hardware of an apparatus for optimizing an optical system according to a first embodiment of the present invention. The apparatus for optimizing an optical system of the embodiment is a computer. More specifically, as shown in FIG. 1, the apparatus for optimizing an optical system comprises a central processing unit (CPU) 11, a main storage (internal storage) 12, an input device 13, output device 14 and an auxiliary storage (external storage) 15. Further, the apparatus for optimizing an optical system has a bus 16 which connects one component to another.

The CPU 11 controls each component and performs predetermined calculation on the basis of a program given. The main storage 12 is constituted of a random access memory (RAM), for example. The main storage 12 is mainly used for an area for the CPU 11 to operate. For example, the main storage 12 stores a program and data loaded from the auxiliary storage 15 and data calculated by the CPU 11.

The input device 13 includes a keyboard or a mouse and is used for inputting various data for setting. The output device 14 includes a display or a printer and is used for outputting calculation results of the CPU 11 to an external device. Examples of the display constituting the output device 14 are a cathode ray tube (CRT) or liquid crystal display (LCD).

The auxiliary storage 15 has an ancillary function to the main storage 12 and stores a program executed by CPU 11, data required for execution of a program and data calculated by CPU 11. The auxiliary storage 15 has a hard disk drive (HDD) 23 connected to the bus 16 through an interface 22 (represented by I/F in FIG. 1), a drive device 24 connected to the bus 16 through an interface 21 and a recording medium 25 removable from the drive device 24. The HDD 23 has a writable hard disk. Each of the hard disk drive 23 and the recording medium 25 corresponds to a specific example of a recording medium on which an optimization program of the present invention is recorded.

Various kinds of memory cards utilizing a flash memory, optical disk or floppy disk are employed as the recording medium 25. Examples of the optical disk used as the recording medium 25 are various kinds of compact disk media such as a compact disc-read only memory (CD-ROM) or compact disk-recordable (CD-R) or magneto-optical (MO) disk. The drive device 24 corresponds to a particular type of the recording medium 25 employed, and has the function of reading data written on the recording medium 25. When the recording medium 25 is writable, the drive device 24 has the function of writing data on the recording medium 25.

With the apparatus for optimizing an optical system, the optimization program of an optical system recorded on the hard disk drive 23 or the recording medium 25 is loaded into the main storage 12 and the loaded optimization program is executed in the CPU 11, thus the optical system is optimized. Data for initial setting necessary for optimization of an optical system or the like are inputted from the input device 13. When inputting data for initial setting, instructions for data input are displayed on the screen of the display of the output device 14. The optimized data are outputted to the display or printer of the output device 14.

The optimization program of an optical system executed in the apparatus for optimizing an optical system may be provided via a communication network such as a local area network (LAN) by connecting a communication interface to the bus 16 instead of being provided from the hard disk drive 23 or the recording medium 25, for example.

Figure 2:
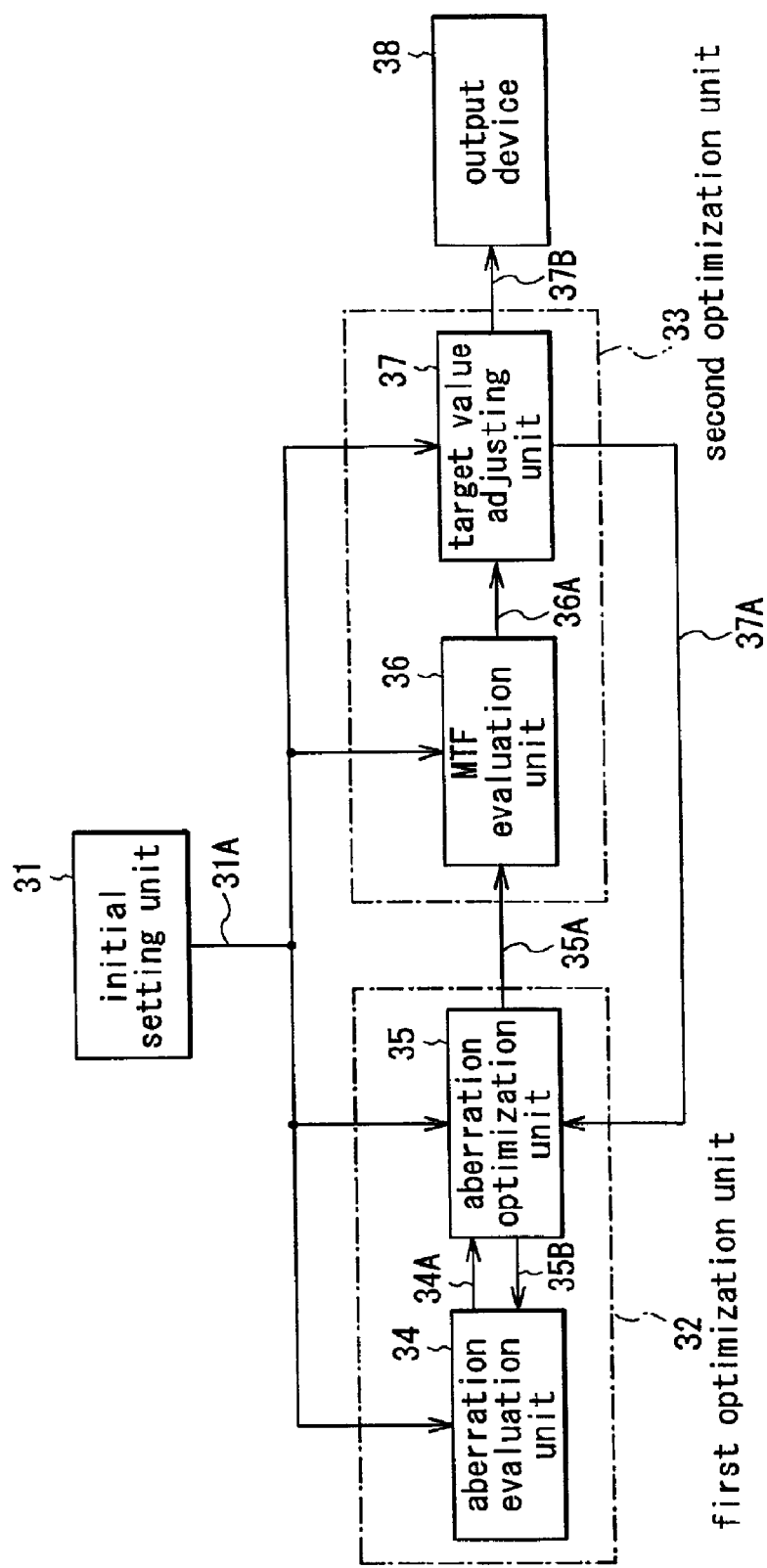
FIG. 2 is a block diagram showing the functional structure of the apparatus for optimizing an optical system according to the first embodiment of the present invention.

FIG. 2 shows the functional structure of the apparatus for optimizing an optical system. As shown in FIG. 2, the apparatus for optimizing an optical system comprises an initial setting unit 31 which conducts initial setting of various data 31A necessary for optimization, a first optimization unit 32 and a second optimization unit 33 which perform various calculation for optimization based on the data 31A retaining the setting from the initial setting unit 31 and an output unit 38 which outputs optimization results.

The initial setting unit 31 conducts setting for initial data retaining the configuration of the optical system, setting for parameters to be used for optimization, initial setting for the merit function and the like, for example. Initial setting for the merit function includes, for example, instructions as to which optical property is subject to evaluation for optimization, initial setting of weights and target values for the instructed evaluation subject and the like. According to the embodiment, described is an example as follows: It is the goal that the evaluated value of the MTF corresponds to a desired value. The optimal solution of the optical system on aberration is sought, and optimization of the optical system is conducted by automatically adjusting the merit function used for seeking the optimal solution in such a manner that the evaluated value of the MTF approaches the desired value as close as possible. Here, adjustment to the merit function denotes adjustment to weights and target values in the merit function for aberration. A method such that optimization of the optical system is conducted by automatically adjusting weights or target values for aberration in a manner that the evaluated value of the MTF approaches a desired value is simply called "MTF optimization" below.

The first optimization unit 32 has the function of seeking an optimal solution of the optical system on aberration. The first optimization unit 32 comprises an aberration evaluation unit 34 and an aberration optimization unit 35. The aberration evaluation unit 34 has the function of obtaining the evaluated value of aberration set as the evaluation subject in accordance with a command 35B from the aberration optimization unit 35, evaluating the optical system subject to design (first evaluation) and outputting a data 34A retaining the evaluation result to the aberration optimization unit 35. The aberration optimization unit 35 has the function of seeking the optimal solution of the optical system on aberration on the basis of the evaluation result of the aberration evaluation unit 34 and a merit function (First function) on aberration. When the evaluated value of aberration is required in order to seek the optimal solution, the aberration optimization unit 35 transmits the command 35B for evaluating the optical system to the aberration evaluation unit 34.

The second optimization unit 33 has the function of automatically adjusting weights or target values for aberration in a manner that the evaluated value of the MTF approaches the desired value and transmitting the result back to the first optimization unit 32. The most striking function of the apparatus for optimizing an optical system is the second optimization unit 33. The second optimization unit 33 includes an MTF evaluation unit 36 and a target value adjusting unit 37. The MTF evaluation unit 36 has the function of performing MTF evaluation (Second evaluation) on the optical system which has been optimized in the aberration optimization unit 35 and outputting a data 36A retaining the evaluation result to the target value adjusting unit 37. The target value adjusting unit 37 has the function of automatically adjusting weights or target values of the merit function of aberration in a manner that the evaluated value of the MTF approaches the desired value, on the basis of the evaluation result of the MTF evaluation unit 36 and the merit function (Second function) with the MTF as the evaluation function, the MTF being set in the initial setting unit 31. The target value adjusting unit 37 also has the function of transmitting the data 37 including the weight and target value which have been automatically adjusted to the aberration optimization unit 35 and making the aberration optimization unit 35 re-seek the optimal solution of the optical system on aberration on the basis of the merit function which has been adjusted using the data 37 automatically adjusted.

The functional structure in FIG. 2 is realized by executing the optimization program of the optical system according to the embodiment in the apparatus for optimizing an optical system with the hardware configuration as in FIG. 1. A brief description regarding to the relationship between the hardware configuration as in FIG. 1 and the functional structure as in FIG. 2 is given below. The function of the initial setting unit 31 is realized mainly by the input device 13. The function of the output unit 38 is realized by the output device 14. The function of the first optimization unit 32 and the second optimization unit 33 is realized when the CPU 11 executes the optimization program of the optical system. Further, the relationship between the functional structure as in FIG. 2 and each means of the apparatus for optimizing an optical system of the present invention will be described below. The aberration evaluation unit 34 corresponds to a first evaluation means; the aberration optimization unit 35 corresponds to an optimization means; the MTF evaluation unit 36 corresponds to a second evaluation means, and the target value adjusting unit 37 corresponds to an adjusting means and a controlling means.

The operation of the apparatus for optimizing an optical system with the above mentioned configuration and a method of optimizing an optical system which is realized by the apparatus for optimizing an optical system will be described herein below.

Generally one cycle of calculation for optimization largely falls into two operations: calculation of a variation table and a search for the optimal point. The variation table is a table containing amounts changed of each evaluation subject such as aberration in accordance with slight changes of each parameter. In order to obtain the variation table, evaluation of the optical system needs to be conducted for the number of times equal to the number of parameters. When the optical property subject to evaluation shows linearity relative to parameters, the optimal point can be obtained only from the information of the variation table. On the other hand, when the evaluation subject shows nonlinearity with parameters, a search for the optimal point has to be conducted by trial and error with reference to the variation table. More specifically, the optical system is evaluated at several candidate points and the optimal point is selected among these candidate points. The farther the candidate point is away from the starting point with which the variation table is obtained, the more different the actual state at the candidate point is from the state projected from the variation table. Therefore, the variation table is re-compiled using optimal points obtained so far and a further search for optimal points is conducted.

With the apparatus for optimizing an optical system, the optimal solution of the optical system is obtained using the merit function with aberration as the evaluation target in the first optimization unit 32 (FIG. 2), and weights or target values of the merit function for aberration are automatically adjusted in the second optimization unit 33 in a manner that the evaluated value of the MTF approaches the desired value. At this time, at least during one cycle of calculation for optimization on aberration, evaluation of the MTF and adjustment to the weight and target value for aberration are not conducted in the second optimization unit 33. With the apparatus for optimizing an optical system, when at least one cycle of calculation for optimization on aberration is completed in the second optimization unit 33, the MTF is evaluated and the weight or target value for aberration is automatically adjusted in the manner to be described below. Thereafter, another cycle of calculation for optimization is conducted in the first optimization unit 32 using the adjusted weight and target value. By repeating this process weights and target values for aberration are appropriately adjusted in accordance with the performance objective of the MTF, thus the result of optimization approaches the performance objective of the MTF. With respect to optimization on aberration, conventionally there exists an efficient and high-speed algorithm. Meanwhile, evaluation of the MTF takes longer time than that of aberration. With this conventional method, optimization of the MTF is conducted in a way that evaluation of the MTF is performed for the same number as that of evaluation of aberration in one cycle of optimization. On the other hand, with the apparatus for optimizing an optical system of the invention, evaluation of the MTF is performed only once for every one cycle or more cycles of optimization for aberration. Thus, the apparatus for optimizing an optical system of the invention can process optimization for a very short time compared to the conventional method.

With the apparatus for optimizing an optical system, repetition of the cycle of the MTF optimization including automated adjustment to weights and target values is halted when all performance objectives of the MTF are satisfied or judgment that no further improvement can be expected is made. For instance, assume that performance objectives of the MTF of the S direction and the T direction are set at each sample object point for several spatial frequencies. For judgment on the overall improvement of the MTF, a merit function for the MTF has to be defined. A simple example of the merit function for the MTF is a sum total of differences between the target values of the MTF and the present evaluated values of the MTF with regard to all evaluation subjects of the MTF which have not reached the target value. In the apparatus for optimizing an optical system, a degree of improvement of the merit function for the MTF is checked in the second optimization unit 33 for every predetermined cycles of the optimization of aberration. When improvement is not recognized for the number of cycles specified, repetition of the optimization cycle is halted.

Figure 3:
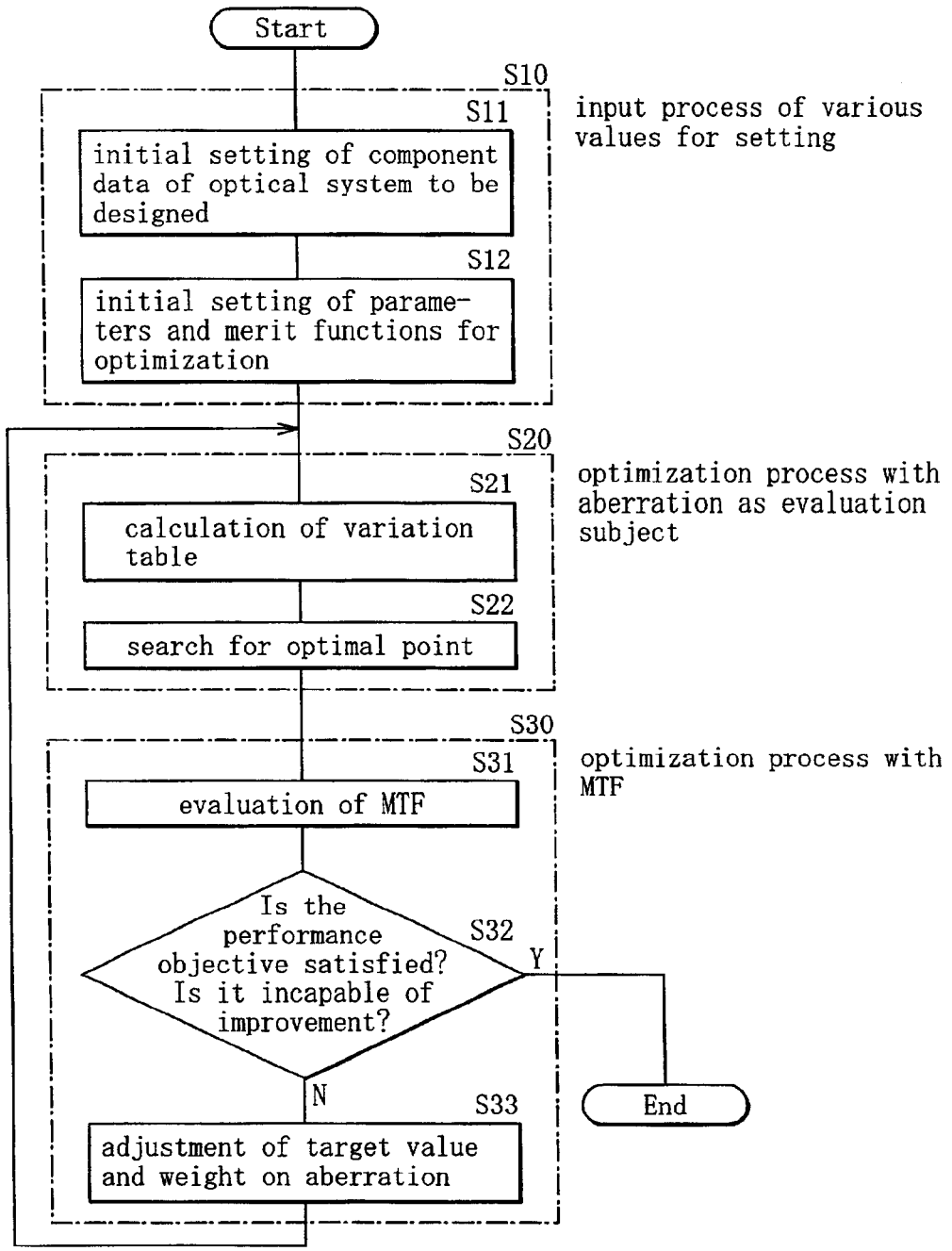
FIG. 3 is a flow chart showing a procedure of the operation of a method of optimizing an optical system which is realized by the function of the apparatus for optimizing an optical system according to the first embodiment of the present invention.

With reference to FIG. 3 an overall flow of the MTF optimization process will be described on the time series. With the embodiment, the optimization program for implementing a process including each step as in FIG. 3 is recorded on the hard disk drive 23 or the recording medium 25 (FIG. 1) in the form of a program executable in a computer, for example.

With the apparatus for optimizing an optical system, first the initial setting unit 31 (FIG. 2) performs input process of initial setting values of various data 31A required for optimization (Step S10). In this input process, firstly initial data indicating the structure of the optical system to be designed, that is, the data of the structure of the optical system to be the starting point for optimization are set (Step S11). A specific example of the data of the structure of the optical system is lens data of the starting point in the experimental example to be described later (FIG. 5). Then, in the input process setting for parameters for optimization and initial setting for the merit function or the like are performed (Step 12). The setting for the merit function includes instructions as to which optical property is subject to evaluation for optimization and initial setting for weights and target values for the evaluation subject instructed. In the setting of the merit function, the merit function on aberration and the merit function for the MTF which is the ultimate performance objective are mainly set. Specific examples of the setting of parameters and the initial setting of the merit function are shown in FIGS. 6 and 7 in the experimental example. In the input process of initial setting values, the apparatus for optimizing an optical system successively receives data which are directly inputted by a designer through the input device 13. Alternatively, part of the data for initial setting is pre-recorded on the recording medium 25 or the like in the apparatus for optimizing an optical system and the data may be read one by one.

After completing setting of various data for optimization, the first optimization unit 32 performs optimization process of the optical system on aberration on the basis of the setting (Step S20). The optimization process on aberration may be performed one cycle or several cycles prior to the MTF evaluation. In this optimization process, the aberration evaluation unit 34 performs evaluation of the optical system (First evaluation) for the number of times equal to the number of parameters (Step S21). Thereafter, calculation of the variation table is performed on the basis of the evaluation result (Step S21). Actual calculation of the variation table is performed by the aberration optimization unit 35. Next, a search for the optimal point of the parameters is performed in a manner that the set merit function takes the minimum on the basis of the obtained variation table (Step S22). This search for the optimal point is performed by the aberration optimization unit 35.

After performing at least one cycle of the optimization process on aberration, the second optimization unit 33 performs automated adjustment to the merit function for aberration (Step S30). In order to perform the automated adjustment to the merit function, the aberration optimization unit 35 performs evaluation of the MTF (Second evaluation) on the optical system optimized by the aberration optimization unit 35 on the basis of the data 35A of the optimal solution obtained by the aberration optimization unit 35 (Step S31). Subsequently, the apparatus for optimizing an optical system judges whether a desired performance objective of the MTF is satisfied or not (Step S32). When the performance objective is satisfied (Step S32; Y), the output unit 38 outputs the optimization result. The judgment made in Step S32 includes a judgment as to whether further improvement of the MTF can be expected or not. With the apparatus for optimizing an optical system, even in the case where the MTF has not reached the set target value, even when further improvement of the MTF cannot be expected (Step S32; Y), calculation for optimization is halted at that point and the optimization results is outputted.

Meanwhile, in the case where the performance objective of the MTF is not satisfied, when further improvement of the MTF can be expected (Step S32; N), the apparatus for optimizing an optical system returns to Step 20 after automatically adjusting weights and target values of the merit function for aberration in a manner that the evaluated value of the MTF approaches the desired value (Step S33). This automated adjustment is conducted by the target value adjusting unit 37 on the basis of the evaluation results of the MTF by the MTF evaluation unit 36 and the merit function (Second function) on the MTF, the MTF being set in the initial setting unit 31. The target value adjusting unit 37 transmits the data 37A to the aberration optimization unit 35, the data 37A describing the weights and the target values which have been automatically adjusted, and makes the aberration optimization unit 35 re-perform optimization of the optical system with aberration as the evaluation object. With the apparatus for optimizing an optical system, the optimization process including above-mentioned steps is performed, thereby realizing favorable optimization aimed at improving the MTF as the ultimate goal.

The automated adjustment to the merit function will be described in detail below. Heretofore, adjustment to weights and target values of the merit function has been conducted routinely by a designer. The algorithm for the automated adjustment to weights and target values of the merit function used in the apparatus for optimizing an optical system of the embodiment is different from the conventional adjustment method performed by a designer. A human being makes very complicated judgment at one time considering various factors but it is not easy to accurately program the path of the thought. As compared to the automated adjustment program which is created based on the human thought, the automated adjustment program to be described below is practical. A simple procedure which can be processed by a machine is created, and this procedure is repeated, which realizes the function equal to that performed by a human. Repeating the simple procedure is too easy for humans to perform, but a calculating machine can perform this process at high speed. The automated adjustment to the merit function in the apparatus for optimizing an optical system can be divided into three functions as follows:

(1) Adjustment to a relative value of a weight of each optical property at a plurality of different sample object points.

(2) Adjustment to a peak position control function related to control over the peak position of the MTF.

(3) Adjustment to a relative value of a weight of each of a plurality of different sample rays from one sample object point.

Adjustment as in (1) will be described below. Here, a plurality of sample object points are set at different positions in the optical system to be designed and performance objectives of the MTF are given to each sample object point. In this case, it is difficult to tell in advance that how much weight should be given to each of the sample object points on aberration, so that the balance of the MTF at each sample object point becomes identical to the performance objective. For example, when calculation for optimization is performed using the same weight in the functions for aberration of two sample object points, MTF values of the obtained optimal points of the two sample points are not always the same. Further, values of the MTF in the S direction and T direction of the same sample object point with the same spatial frequency are not necessary the same. Here, considered is a case where an X coordinate and a Y coordinate orthogonal to each other on the image plane are given, and the X coordinate and the Y coordinate are set so as to correspond to the S direction and the Y direction in a frequency space. In this case, improvement in aberration of X components mainly contributes to improvement of the MTF in the S direction while improvement in aberration of Y components mainly contributes to improvement of the MTF in the T direction. With the apparatus for optimizing an optical system, depending on the state of the optimal point obtained, the weight for aberration of X components is made larger with regard to the sample points which have not achieved the performance objective of the MTF in the S direction while the weight for aberration of X components is made smaller with regard to the sample points which exceed the performance objective of the MTF in the S direction. Even though the sample object point has not achieved the MTF performance objective, the weight does not need to be made larger while the MTF performance is kept improving. The same operation is applied to the MTF in the Y direction and aberration of Y components.

Adjustment as in (2) will be described below. In the optical system, intensity distribution of a luminous flux at the front and rear of the set image plane varies relative to the amount of shift of the image plane. The intensity distribution at the image plane is not always more preferable than that at the position shifted forwardly or backwardly. With the optical system, the MTF value changes relative to the amount of shift of the image plane and comes to a peak at a shifted position of image plane. With a general optical system, it is important that the peak position approaches the image plane as close as possible in order to improve the MTF. Unlike MTF values, the peak position of the MTF has less non-linearity with parameters, whereby the peak position of the MTF can be a subject for optimization. However, it takes longer calculation time to obtain the peak position of the MTF than to obtain MTF values at the image plane. Therefore, in this embodiment, the peak position of the MTF is not directly optimized but the function for aberration typifying the peak position of the MTF is constructed and controlled, thus indirectly the peak position of the MTF can be controlled.

In the optical system, the amount of change of curvature of field of a principal ray and the amount of change of the peak position of the MTF are correlated. When the curvature of field of the S direction shifts to the plus side, there is high possibility that the peak position of the MTF of the S direction shifts to the plus side for the same amount of the shift of curvature of field. Analogously, when the curvature of field of the T direction shifts to the plus side, there is high possibility that the peak position of the MTF of the T direction shifts to the plus side for the same amount of the shift of the curvature of field. Accordingly, inclusion of the function of curvature of field of a principal ray in the function for controlling the peak position of the MTF makes it possible to control the peak position of the MTF to some extent. Here, assume that curvature of field is the evaluation subject and the present evaluated value is f. In the case where the peak position of the MTF is adjusted using f, when the peak position of the MTF is p, the merit function is set with f-p as a new target point of the curvature of field. When optimization is performed using this merit function, according as the curvature of field changes by about -p, the peak position of the MTF changes by about -p, thus the peak position of the MTF returns to the vicinity of the image plane. By repetition of such a control, the peak position of the MTF approaches the image plane as close as possible.

However, to be accurate the curvature of field of the principal ray does not always typify change of the convergence point of the luminous flux. A "mean of longitudinal aberrations" and "minimum point of square spot size" to be defined below are considered to be the function for aberration of the typical peak position of the MTF.

With the optical system, transverse aberration of X components of each sample ray becomes 0 at a certain point shifted of the image plane. The amount of shift with which the transverse aberration becomes 0 is called "longitudinal aberration" as a contrast to the transverse aberration. The mean of longitudinal aberrations of X components of all sample rays typifies the peak position of the MTF of the S direction. The mean of longitudinal aberrations of the Y direction is also defined in the same manner. When the X coordinate of the $_i$th sample ray is $X_i$ and the X coordinate of the mean of all sample rays of $X_i$ is $X_m$, the mean of all sample rays of $(X_i-X_m)^2$ is called "square spot size" of the S direction. The square spot size of the S direction is a function of the amount of shift of the image plane, and the minimum point of the square spot size typifies the peak position of the MTF of the S direction. Analogously, the minimum point of the square spot size of the T direction is also defined in a same manner. Values of the function for aberration typifying the peak position of the MTF described above may be obtained using sample rays with all wavelengths or sample rays with a standard wavelength. The peak position of the MTF shifts in accordance with the spatial frequency to some extent. When the MTF with a plurality of spatial frequencies is the performance objective, the mean of the peak positions with these special frequencies is obtained.

Adjustment as in (3) will be described below. With the optimization method, adjustment to weights for aberration is not always performed at the same rate with regard to different sample rays reaching from one sample object point. For instance, relative magnitude of weights may be different to each other between a ray group in which rays pass through the center of the pupil of the optical system and a marginal ray group. The value of the MTF may be improved by adjusting relative values of weights of each sample ray. Further, with the apparatus for optimizing an optical system different values of weights may be set with regard to two components orthogonal to each other (X components and Y components) of each sample ray.

As described above, with the method of optimizing an optical system and the apparatus for optimizing an optical system of the embodiment, the optimal solution of the optical system is obtained using the merit function with aberration as the evaluation object. Further, weights and target values of the merit function for aberration are automatically adjusted in a manner that the evaluated value of the MTF and the like approaches a predetermined value, and then optimization of the optical system is re-conducted using the adjusted weights and target values. Thus, the function equivalent to the conventional process in which weights and target values are manually adjusted by a designer can be automated. Accordingly, optical properties with high non-linearity such as the MTF can be efficiently optimized at high speed compared to the conventional method.

[Experimental Example 1]

An experimental example of lens optimization using actual numeric values in which the method of optimizing an optical system and the apparatus therefor according to the first embodiment will be described below.

Figure 4:
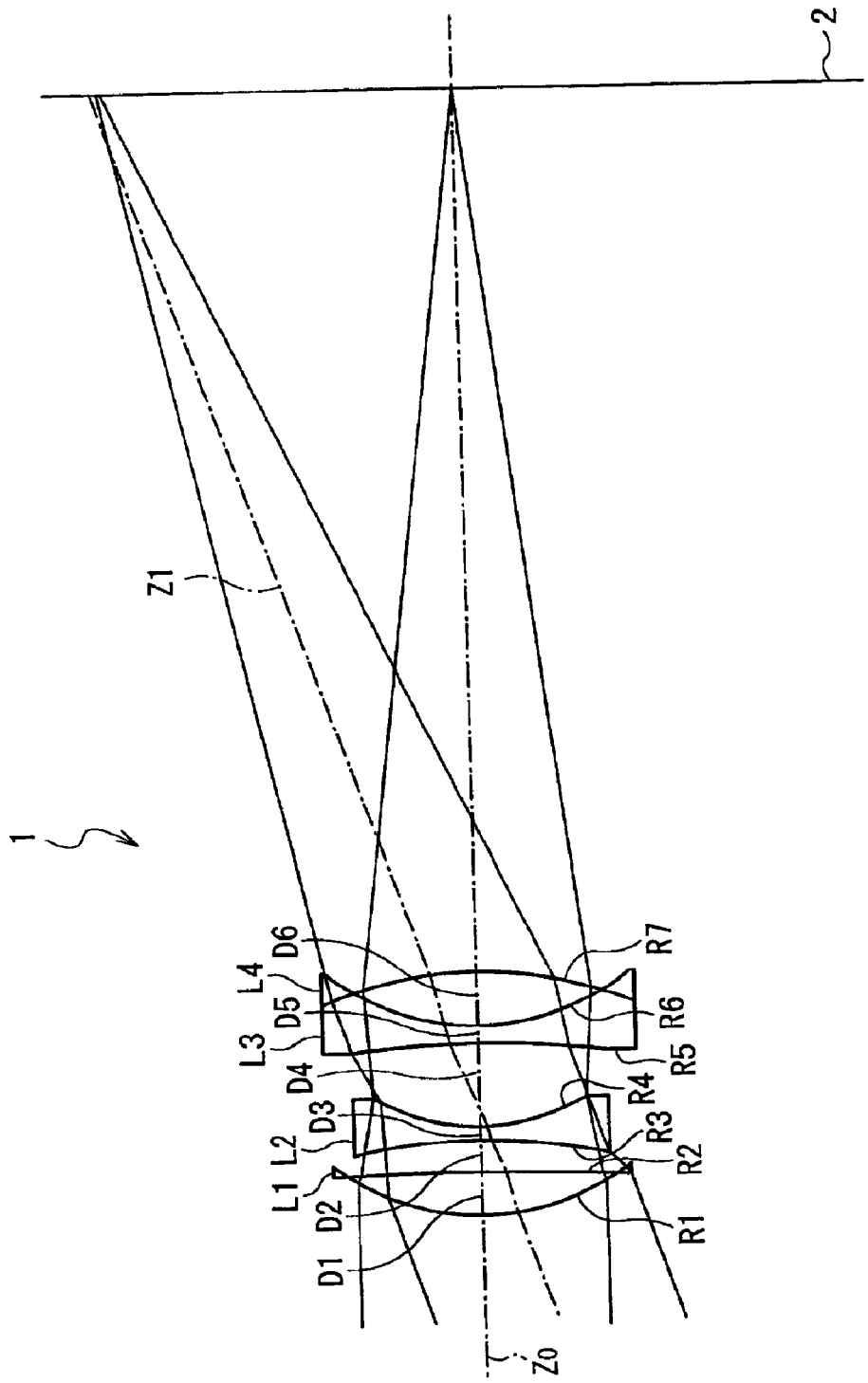
FIG. 4 is a sectional view of the lens of the starting point for optimization in an experimental example with actual numeric values in which the apparatus for optimizing an optical system and the method of optimizing an optical system according to the first embodiment of the present invention are employed.

In this experimental example 1, a tessar type photographic lens as in FIGS. 4 and 5 is subject to optimization. FIG. 4 shows the configuration of a photographic lens 1 of the starting point before optimization. FIG. 5 shows lens data of the components of the photographic lens 1 as in FIG. 4 in numeric values. In FIG. 4, the line indicated by Zo represents an optical axis and the line indicated by Z1 represents a principal ray at the maximum field angle. The line indicated by 2 is the position of the plane of image formation. In FIG. 5, a surface number $S_i$ is the number of the $_i$th lens surface incrementing from 1 of the closest lens to the object toward the image plane. In FIGS. 4 and 5, $R_i$ represents the radius of curvature of the $_i$th lens surface $S_i$. $D_i$ represents the surface separation between the $_i$th lens surface $S_i$ and the [i+1]th lens surface $S_i+1$ on the optical axis. In the lens data as in FIG. 5, the refractive index $Nd_i$ and the Abbe's number $vd_i$ are values relative to the d line (wavelength $\lambda_d$=587.6 nm). The radius of curvature $R_i$ and the surface separation $D_i$ is expressed in millimeter (mm).

The photographic lens 1 comprises a first lens L1, a second lens L2, a third lens L3 and a fourth lens L4 in this order from the side of the object. The third lens L3 and the fourth lens L4 constitute a cemented lens in which the image side lens surface of the third lens L3 and the object side lens surface of the fourth lens L4 are jointed.

As shown in FIG. 6, a design condition of the photographic lens 1 is as follows; focal length f of the whole system is 50 mm; F number (Fno.) is 4.0; location of object point is infinite; half field angel ω is 20 degrees; distortion is within 1%; and vignetting is none. Sample object points for evaluation of optical performance are set at three positions: the center (on the optical axis; half field angle ω=0), a point at the half field angle ω of 14 degrees and a point at the half field angle ω of 20 degrees. A frequency for MTF evaluation is set for 40 cs/mm. The sample wavelength is set for 435.8 nm, 546.1 nm and 656. nm and the weight for each wavelength are set for 1:1:1.

With the experimental example 1, MTF optimization is performed under the design condition shown in FIG. 6. In this optimization, numeric values for the radius of curvature $R_i$, surface interval $D_i$, refractive index $Nd_1$ and Abbe's number $vd_i$ in the lens data as in FIG. 5 are used as parameters and the target value to be described below is used in the merit function.

With respect to the merit function for aberration, transverse aberration at each sample field angle and the mean of longitudinal aberrations with a standard wavelength (546.1 nm) are the evaluation subject. The initial value of the target value for aberration is set for 0 and the initial value of the weight is set for 1. The focal distance and distortion are constraint in the design condition and set so as to correspond to the values shown in FIG. 6.

With respect to the merit function for MTF, specifically for the purpose of showing effects of MTF optimization, two different target values for the MTF are set (i.e., two merit functions are constructed) for each field angle as in FIG. 7 and each target value is optimized. As shown in FIG. 7 the MTF performance at the center is emphasized in setting of the first target value (referred to as Target 1 herein later). With Target 1 the MTF of the S direction is 65% at the center and 55% at the field angle of 14 degrees and 20 degrees, and the MTF of the T direction is 65% at the field angle of 14 degrees and 20 degrees. With regard to the setting of the second target value (referred to as Target 2 herein later), the MTF of the S direction is the same value (57%) at all field angles and the MTF of the T direction is the same value (65%) at all field angles. For example, 65% of the MTF denotes 0.65 of the MTF.

FIGS. 8 and 9 show optimal solutions of the lens obtained by performing optimization under the following conditions. FIG. 8 shows the results of optimization using Target 1. FIG. 9 shows the results of optimization using Target 2. In FIGS. 8 and 9 shown are values of optimal solutions of the MTF, the adjustment ratio of the weight for aberration, and the adjusted target value of the mean of longitudinal aberrations with regard to the S direction and the T direction for each field angle. The unit of the mean target value of longitudinal aberrations is indicated in $\mu m$.

In FIGS. 8 and 9, the results of the adjustment ratio of the weight reflect the difference in setting of the target for the MTF. For example, the value of adjustment ratio of weight in Target 1 is greater than that of Target 2, Target 1 emphasizing MTF performance at the center of the field angle. The target value of the mean of longitudinal aberrations reflects a deviation from the peak position of the MTF. For example, when the target value of the mean of longitudinal aberrations is negative, the mean of longitudinal aberrations with a standard wavelength deviates to the negative side from the peak position of the MTF. Since the focal length and distortion are controlled as a constraint, values thereof are not affected by the influence of the adjustment to weights and target values for aberration. Thus, the values of the design condition for the focal length and distortion are not changed. With the experimental example, the value of the merit function of the MTF is 4% in the solution of Target 1 and 2% in the solution of Target 2. Here, the value of the merit function on the MTF is obtained in a manner that the differences between the target value of the MTF and the evaluated value of the MTF at the optimal solution are summed over all sample field angles of the S direction and the T direction.

Figure 12:
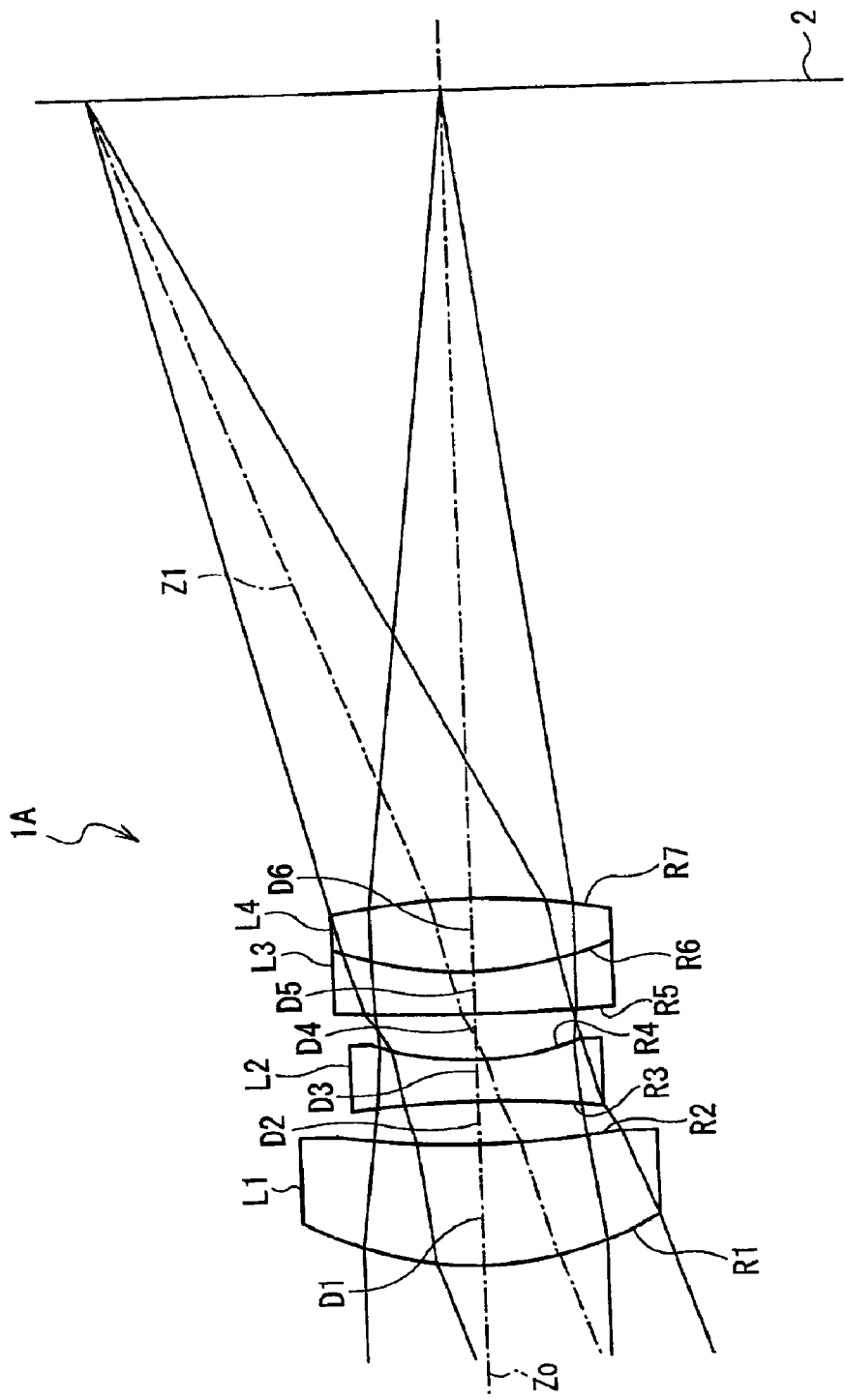
FIG. 12 is a cross sectional view of the lens obtained in the optimization using the first target values shown in FIG. 7.
Figure 13:
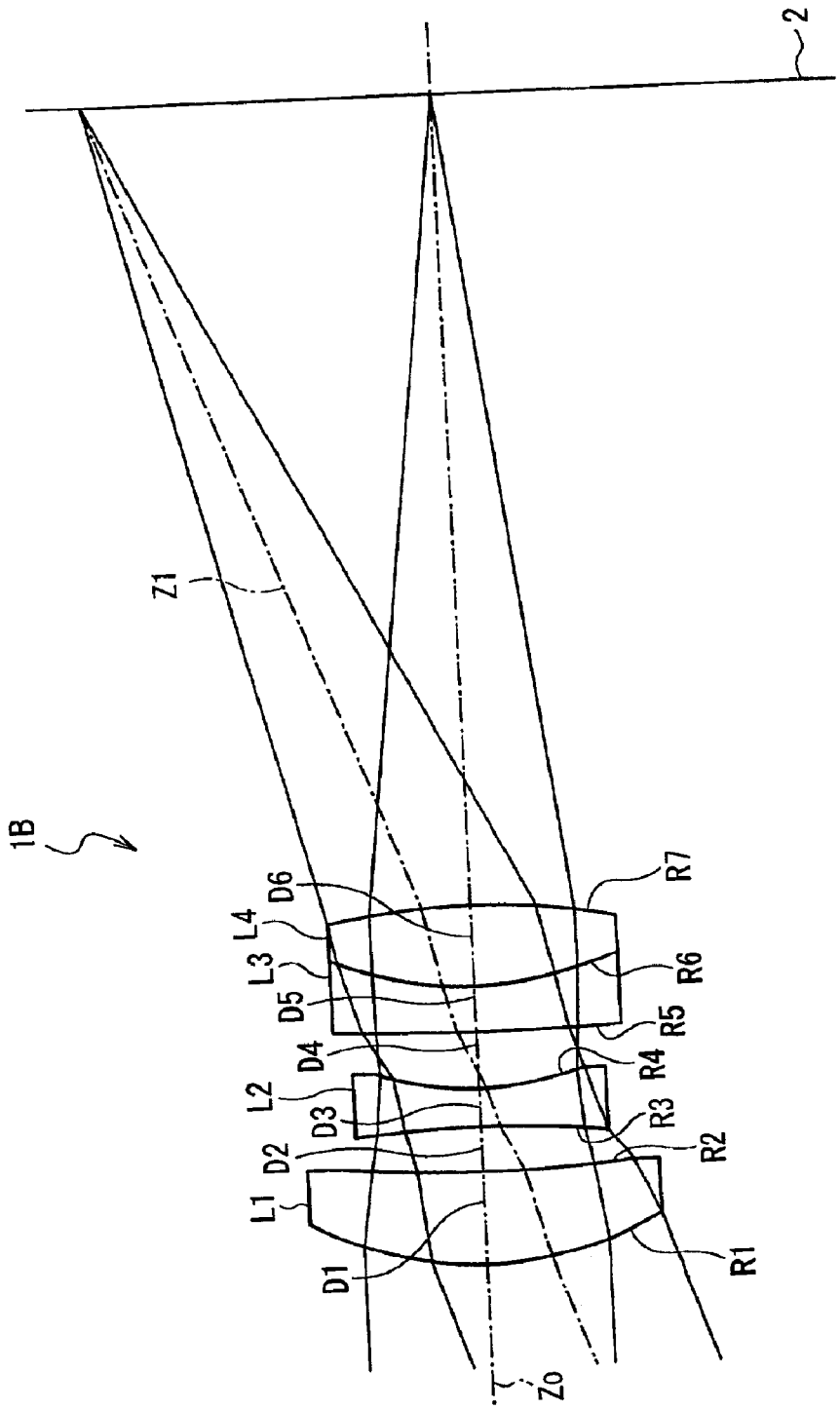
FIG. 13 is a cross sectional view of the lens obtained in the optimization using the second target values shown in FIG. 7.

FIG. 10 shows lens data of a photographic lens 1A obtained by the optimization with Target 1. FIG. 11 shows lens data of a photographic lens 1B by the optimization with Target 2. FIG. 12 illustrates the configuration of the photographic lens 1A corresponding to the lens data in FIG. 10, and FIG. 13 illustrates the configuration of the photographic lens 1B corresponding to the lens data in FIG. 11.

Figure 14:
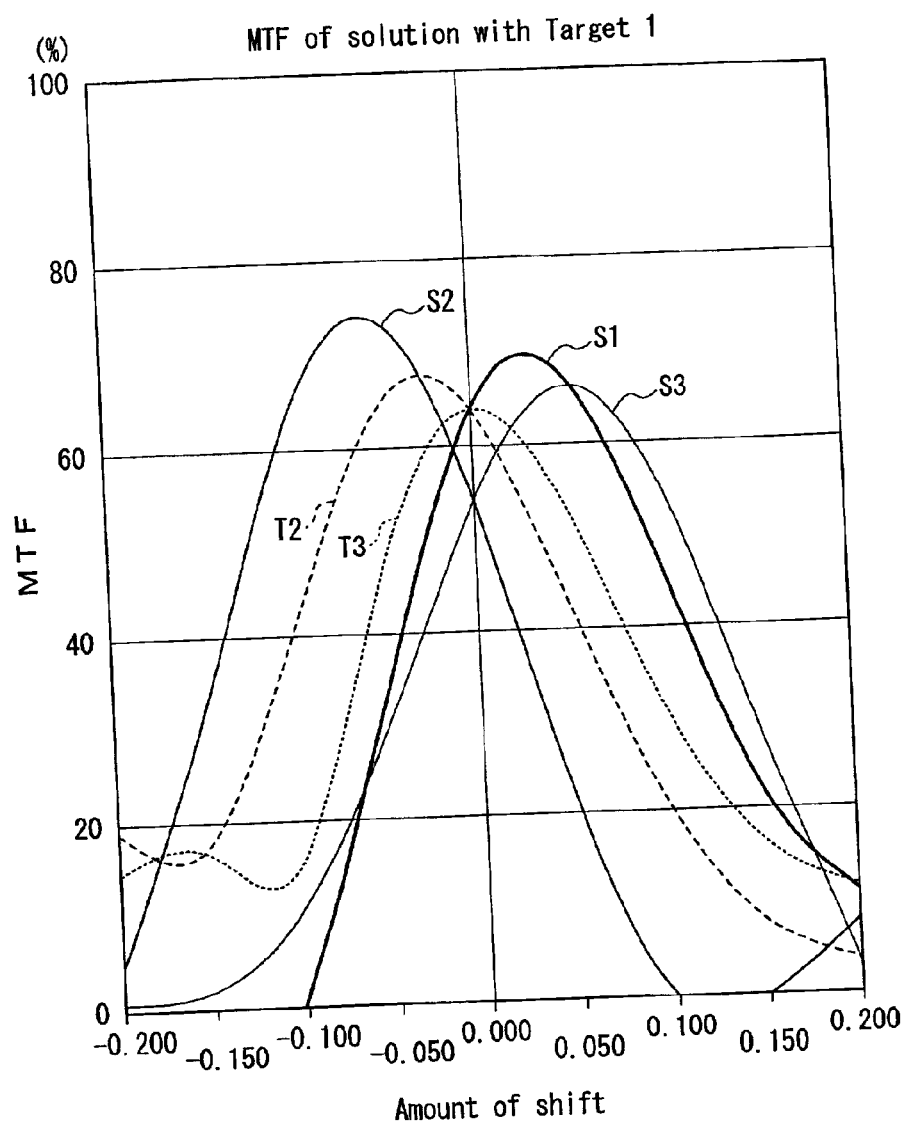
FIG. 14 is a graph showing the MTF performance of the lens obtained in the optimization using the first target values shown in FIG. 7.
Figure 15:
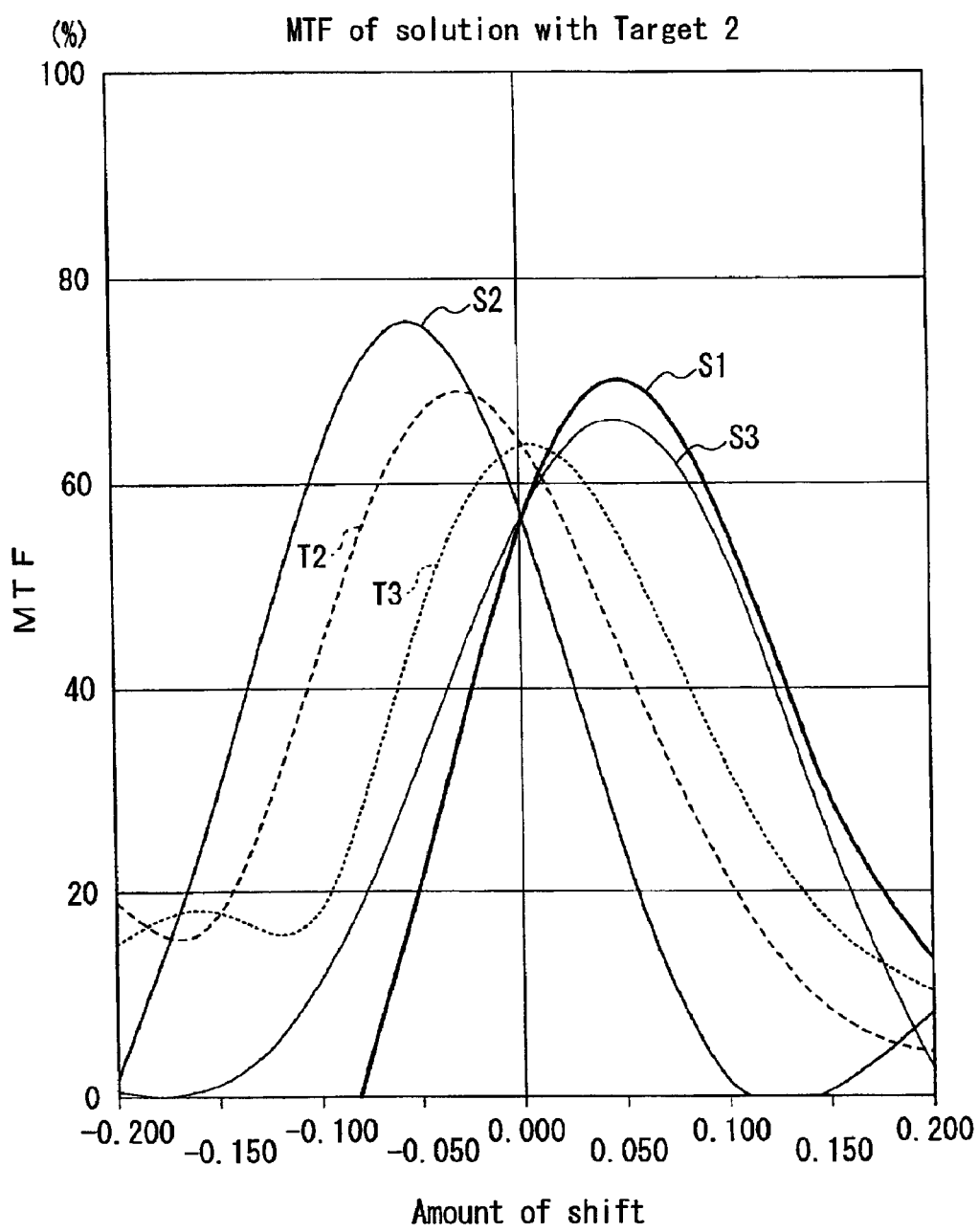
FIG. 15 is a graph showing the MTF performance of the lens obtained in the optimization using the second target values shown in FIG. 7.

FIG. 14 shows the MTF performance of the photographic lens 1A obtained by the optimization with Target 1. FIG. 15 shows the MTF performance of the photographic lens 1B obtained by the optimization with Target 2. In FIGS. 14 and 15, the horizontal axis represents the amount of shift from the image plane while the vertical axis represents the value of MTF (%). In FIGS. 14 and 15, the MTFs of all field angles are shown simultaneously. The solid line denotes the MTF of the S direction and the broken line denotes the MTF of the T direction. Specifically, the solid line denoted by S1 is the MTF of the S direction at the center of the field angle; the solid line denoted by S2 is the MTF of the S direction at the field angle of 14 degrees; the solid line denoted by S3 is the MTF of the S direction at the field angle of 20 degrees; the broken line denoted by T2 is the MTF of the T direction at the field angle of 14 degrees; and the broken line denoted by T3 is the MTF of the T direction at the field angle of 20 degrees.

With the experimental example, 42 cycles of calculation for optimization for Target 1 and 33 cycles of calculation for optimization for Target 2 are run. Here, the cycle denotes the operation of a series of steps of calculation for optimization. For example, one cycle denotes performing one cycle of calculation for optimization on aberration and then one cycle of calculation for optimization for adjusting weights and target values on the MTF.

As a comparative example to the experimental example, calculation for optimization with aberration as the evaluation target is performed without performing automated adjustment to weights and target values for aberration. The same lens data, design condition and the like of the experimental example are set. In this case the minimum point is reached in the 14th cycle. That is, calculation time required for the MTF optimization of the comparative example is only the same as that of the conventional optimization. As another comparative example, performed is conventional optimization such that parameters are directly changed in a manner that the first merit function on the MTF takes the minimum without performing automated adjustment to weights and target values for aberration. In this case, due to the influence of non-linearity of the MTF, the optimal solution near the starting point is the local minimum. Specifically, the evaluated values of the aberration and the MTF of this comparative example are not much improved compared to the evaluated value of the starting point.

As has been described above, with the experimental example preferable optimization of the MTF is realized compared to the conventional method.

[Second Embodiment]

A second embodiment of the present invention will be described herein below. The same elements as those in the first embodiment are indicated by the same reference numerals and the description is appropriately omitted in the following description.

With the second embodiment, MTF optimization in the first embodiment is applied to a so-called global optimization. The function to optimize the optical system according to the second embodiment is realized by executing an optimization program of the optical system of the second embodiment in an apparatus with the hardware configuration shown in FIG. 1 similar to the first embodiment.

With the first embodiment above, MTF optimization such that weights and target values for aberration are automatically adjusted is very efficient and speedy as compared to the conventional optimization. The MTF optimization is especially efficient when it is used with the global optimization. Optimization used in general is a method to seek an optimal solution of a merit function given. However, the global optimization is a method to automatically seek solutions of a plurality of local minimums (local minimum values) in a parameter space of a merit function given.

With the global optimization, the merit function for aberration is subject to optimization. In this case, when the MTF is given as the design objective of the optical system, a designer has to select one solution suitable for the performance objective of the MTF among a number of local minimums obtained by the global optimization. However, there is no guarantee that the best solution of the merit function on aberration corresponds to the performance objective of the MTF.

Figure 16:
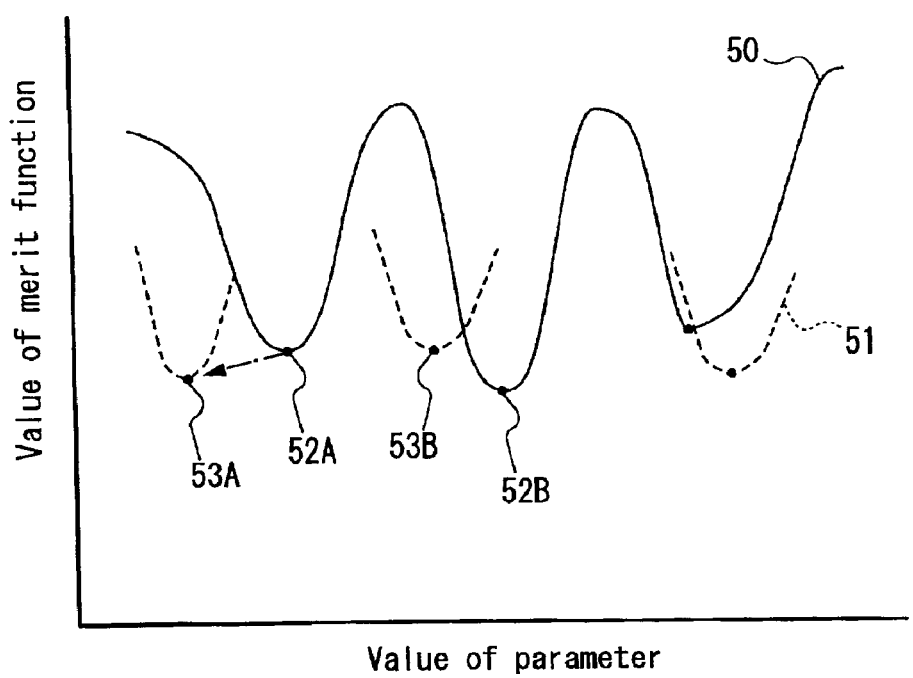
FIG. 16 is a graph showing the concept of global optimization.

In FIG. 16, the vertical axis denotes values of the merit function whereas the horizontal axis denotes values of parameters. With respect to the values of parameters, used is not a specific parameter, but a hybrid parameter consisting of a plurality of parameters in a parameter space. In the drawing, the solid line denoted by 50 is a merit function with aberration as the target value and the broken line denoted by 51 is a merit function with the MTF as the target value. Dots denoted by 52A and 52B are examples of the local minimum of aberration. Dots denoted by 53A and 53B are examples of the local minimum of the MTF. As shown in the drawing, generally the aberration and the MTF do not take the local minimum with the same value of parameters, but take the local minimum with the use of different values of parameters. In the case shown in the drawing, with respect to aberration the dot 52B is the best value among a plurality of local minimums, but it is not always that the local minimum (dot 53B) of the MTF close to the dot 52B is the best value of the MTF. With the case as in the drawing, the dot 53A is the best value among a plurality of local minimums of the MTF.

With the case shown in FIG. 16, it is impossible to tell where the best value of the MTF is. Therefore, several solutions in which the value of the merit function for aberration is preferable are selected and a designer manually adjusts weights and target values for aberration using these several solutions as the starting point; and keeps adjusting to find the best value of the MTF, which is the conventional procedure of lens design. However, when this process is manually performed by a designer, the MTF performance can be optimized in only several solutions and manual work requires a considerable amount of time. Further, there is a possibility that a solution without adjustment weights and target values corresponds to the performance objective of the MTF. The MTF optimization in the embodiment is the optimization in which the above-described manual operation is automated. The MTF optimization of the embodiment is manually performed not by a designer but by a calculating machine, whereby adjustment to weights and target values of local minimums is performed at high speed. Among the results of MTF optimization of all local minimums, the best solution is further selected, thus the global best solution for the MTF performance can be accurately found. Choice of the best solution among the results of the MTF optimization of all local minimums may be performed by a designer. On the other hand, among a plurality of solutions, not only a minimum solution in which the merit function takes the minimum but also solutions in the vicinity thereof may be selected considering the value of the merit function for the MTF and outputted automatically.

There are considered to be two kinds of combination of global optimization and MTF optimization as in (i) and (ii) below. In each method, the conventional calculation for global optimization may be used for the method of seeking a plurality of local minimums of aberration. The global optimization is realized in the following manner, for example. A program for global optimization is recorded on the hard disk drive 23 or the recording medium 25 (FIG. 1) in the form of a program executable in a computer, and the program is loaded into the main storage 12 and executed by the CPU 11. In the embodiment the first optimization unit 32 in FIG. 2 has the function for global optimization.

(i) A plurality of local minimums is obtained in the global optimization and then the MTF optimization is applied on the all solutions of local minimums obtained.

(ii) Every time one solution of a local minimum is obtained in the global optimization, the MTF optimization is applied on this solution.

Figure 17:
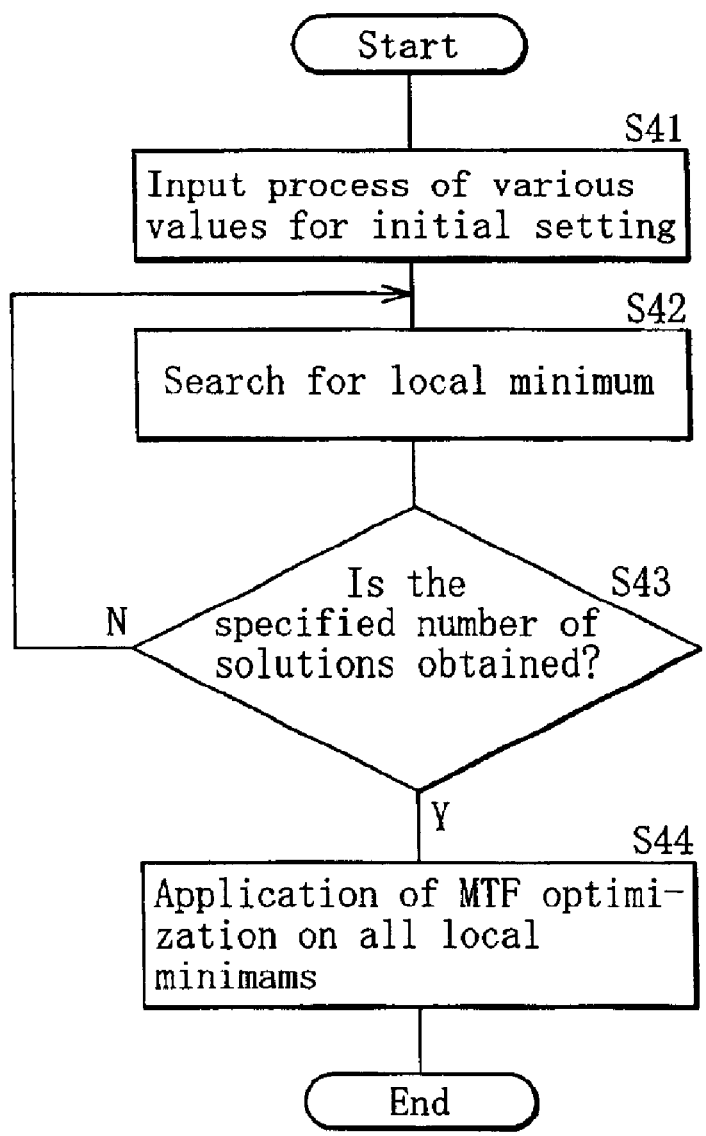
FIG. 17 is a flow chart showing a procedure of operation of a method of optimizing an optical system which is realized by the function of the apparatus for optimizing an optical system according to a second embodiment of the present invention.
Figure 21:
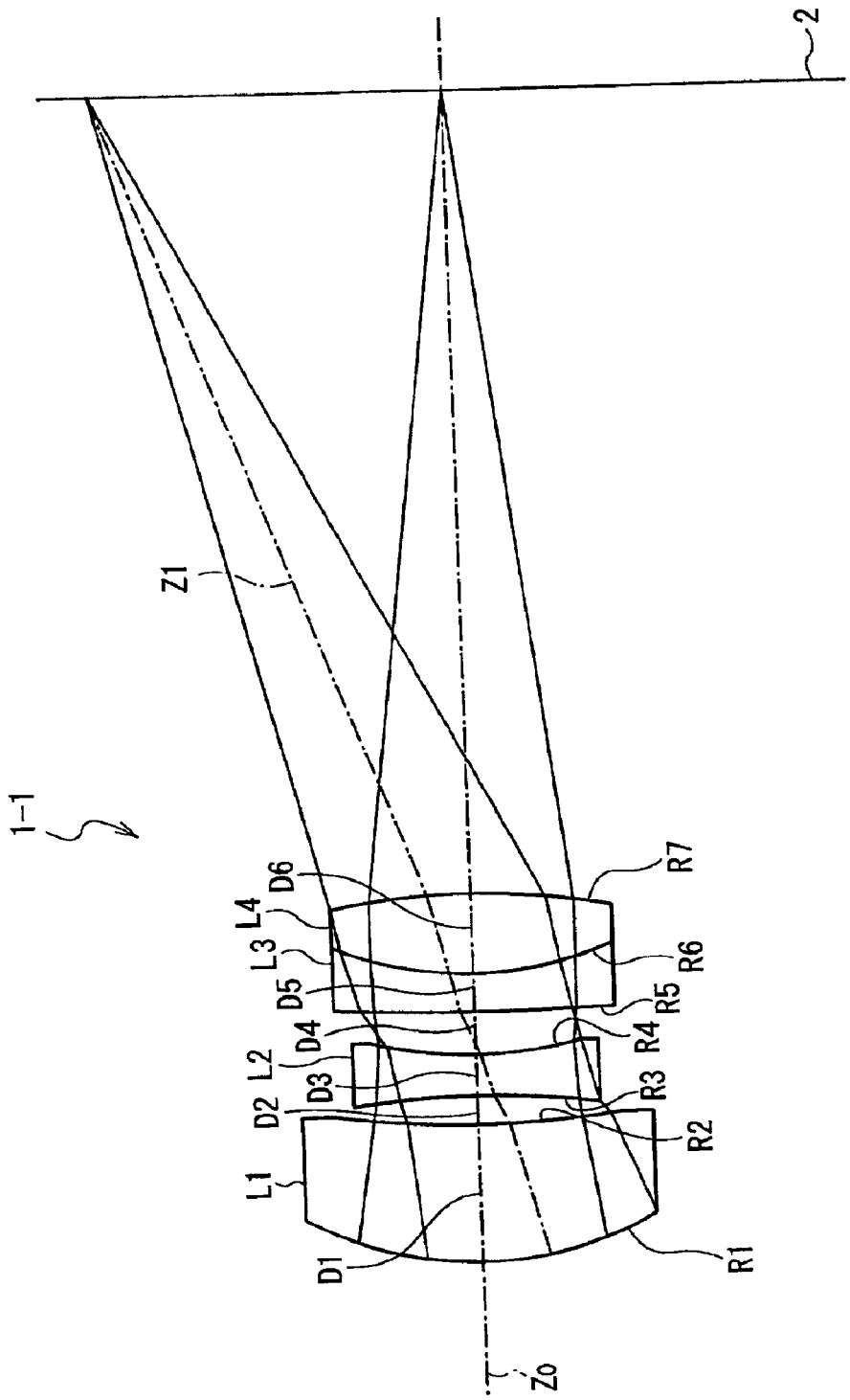
FIG. 21 is a sectional view of the lens obtained based on the first solution in FIG. 19.
Figure 22:
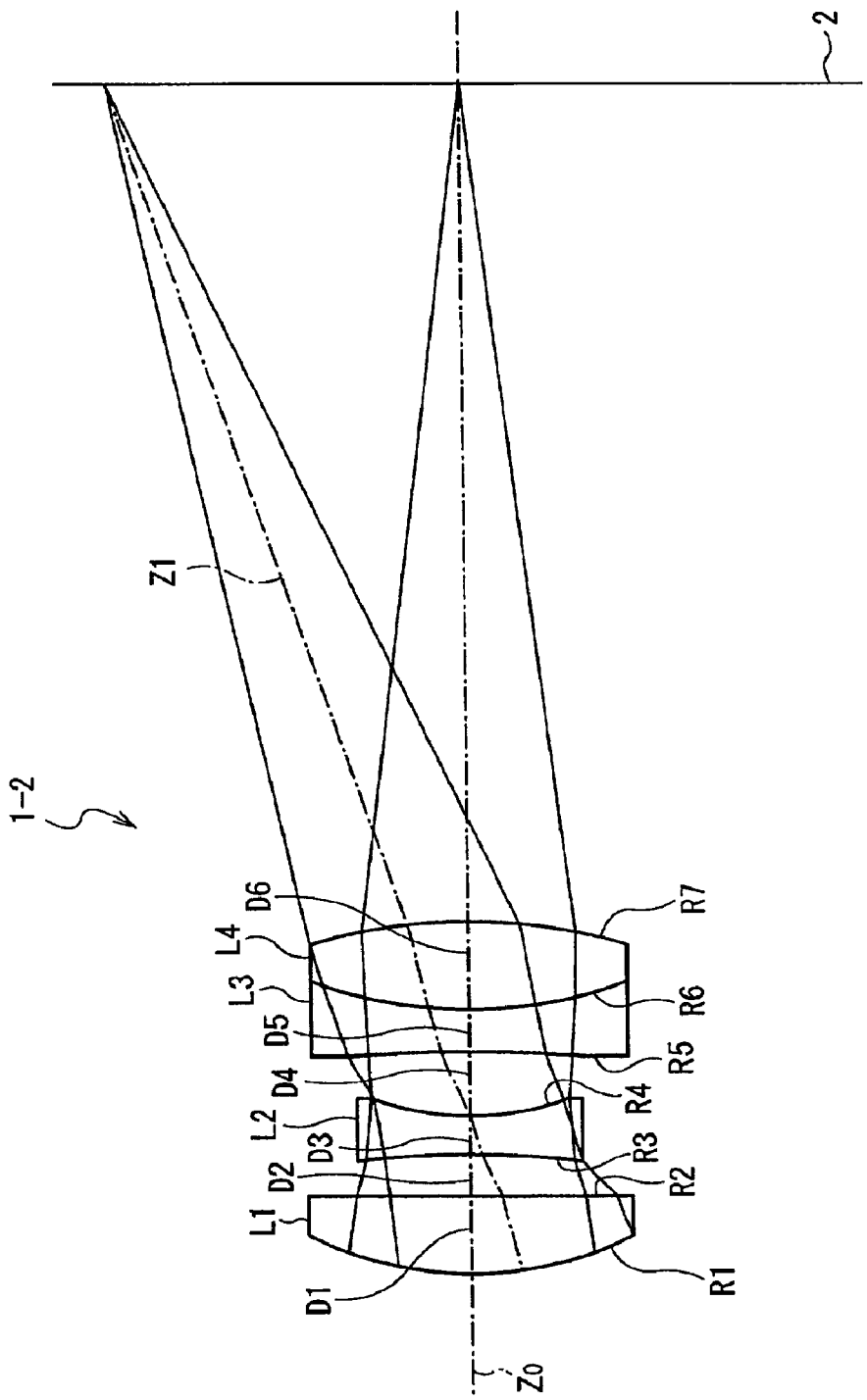
FIG. 22 is a sectional view of the lens obtained based on the second solution in FIG. 19.
Figure 23:
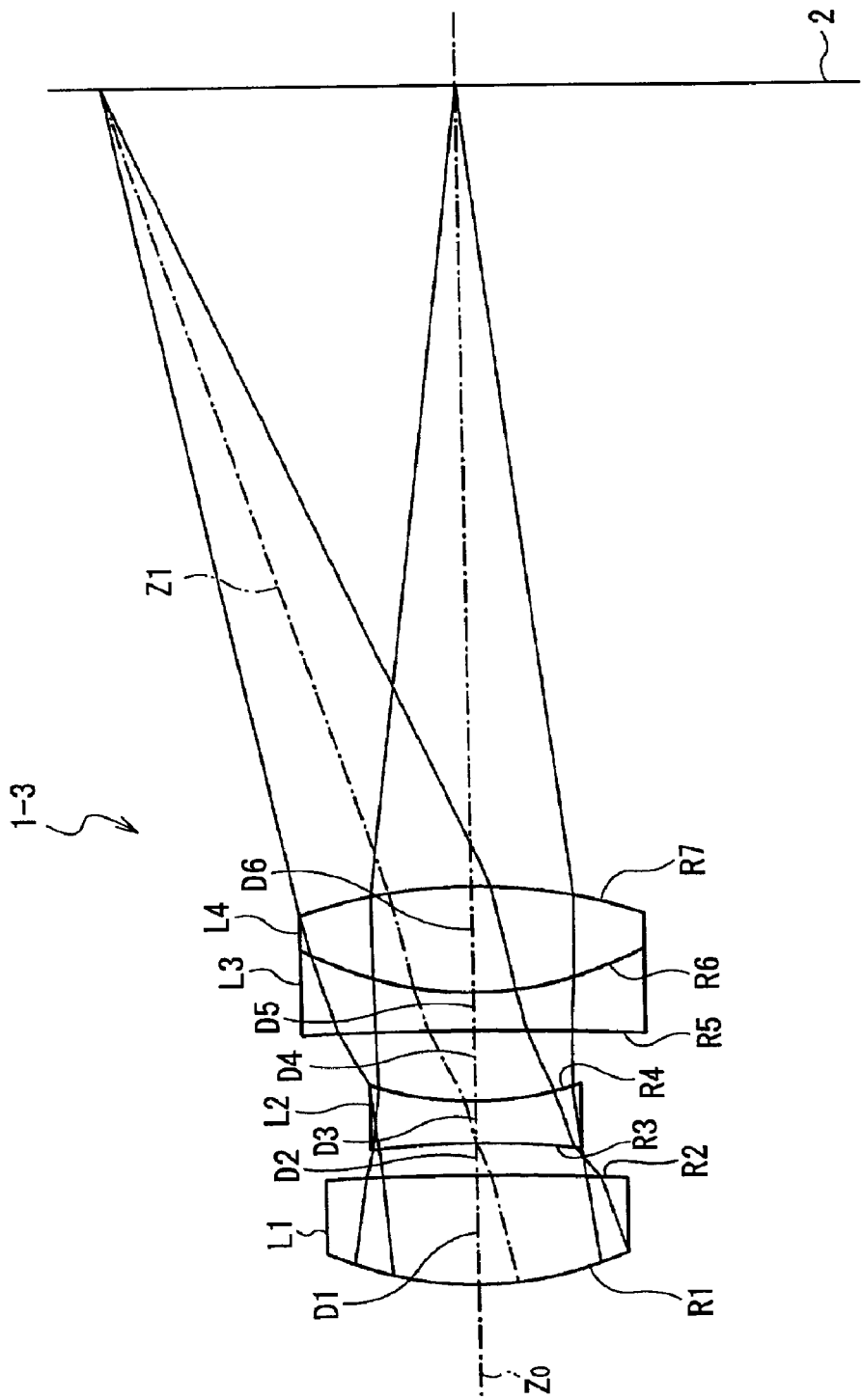
FIG. 23 is a sectional view of the lens obtained based on the third solution in FIG. 19.
Figure 24:
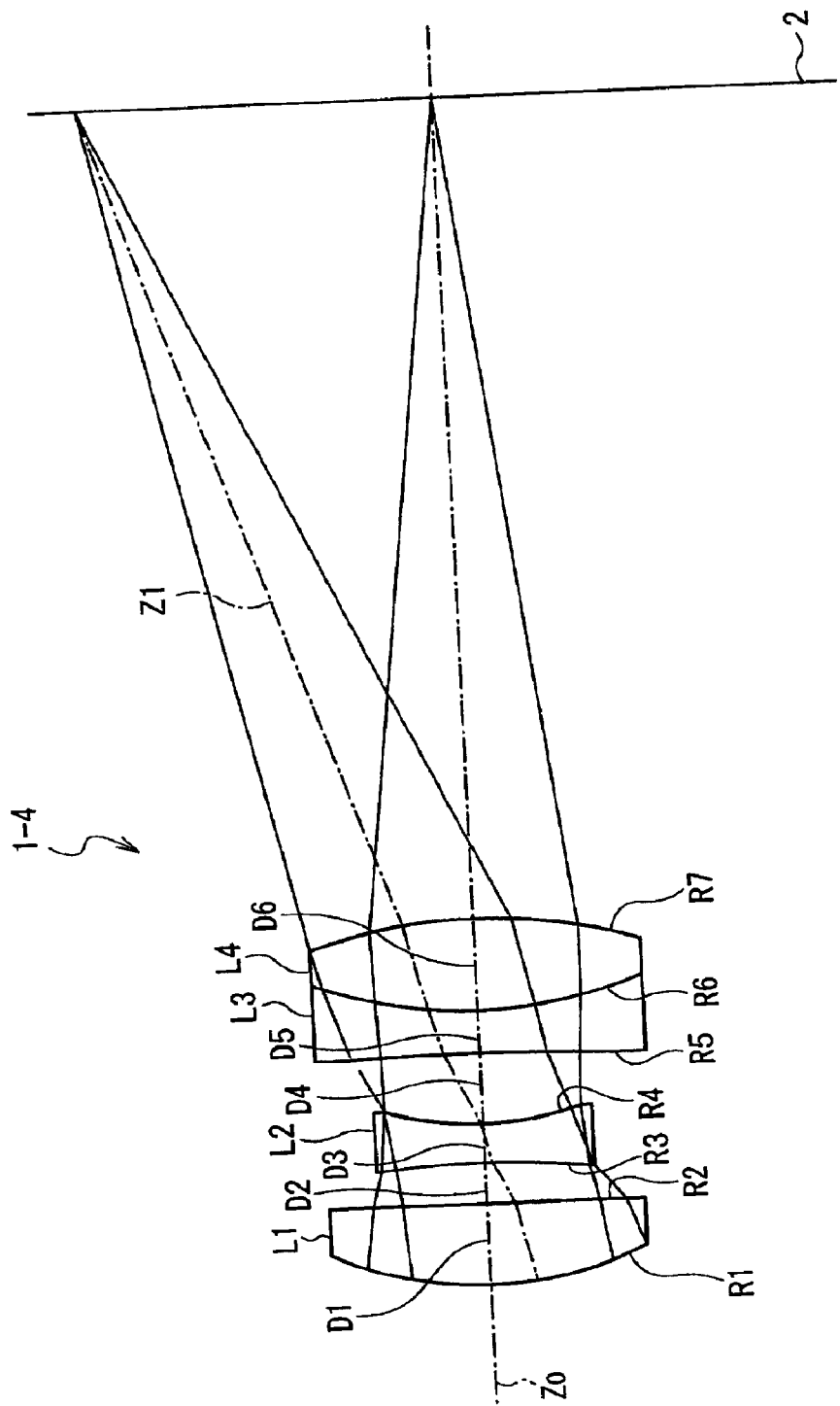
FIG. 24 is a sectional view of the lens obtained based on the fourth solution in FIG. 19.
Figure 25:
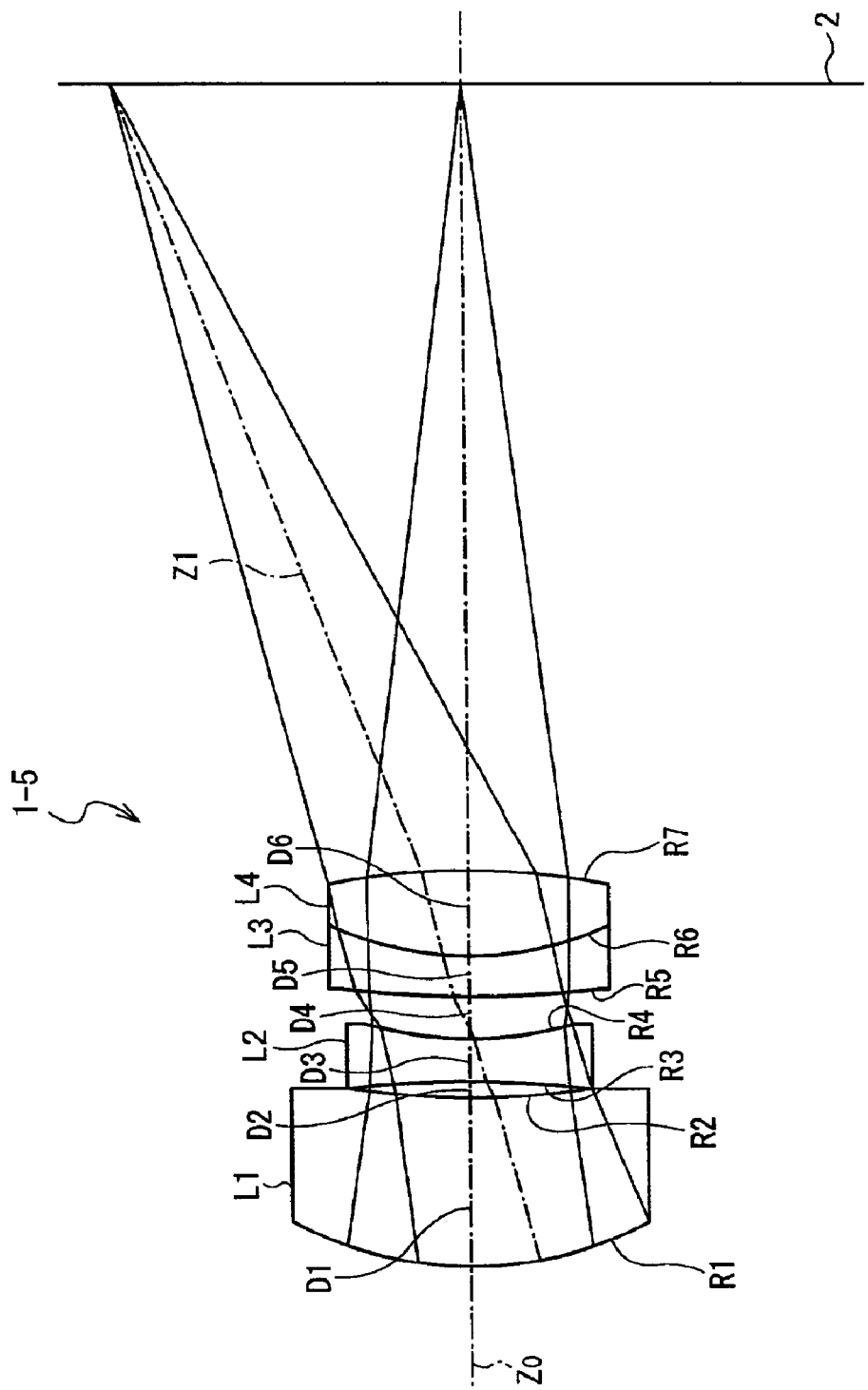
FIG. 25 is a sectional view of the lens obtained based on the fifth solution in FIG. 19.
Figure 26:
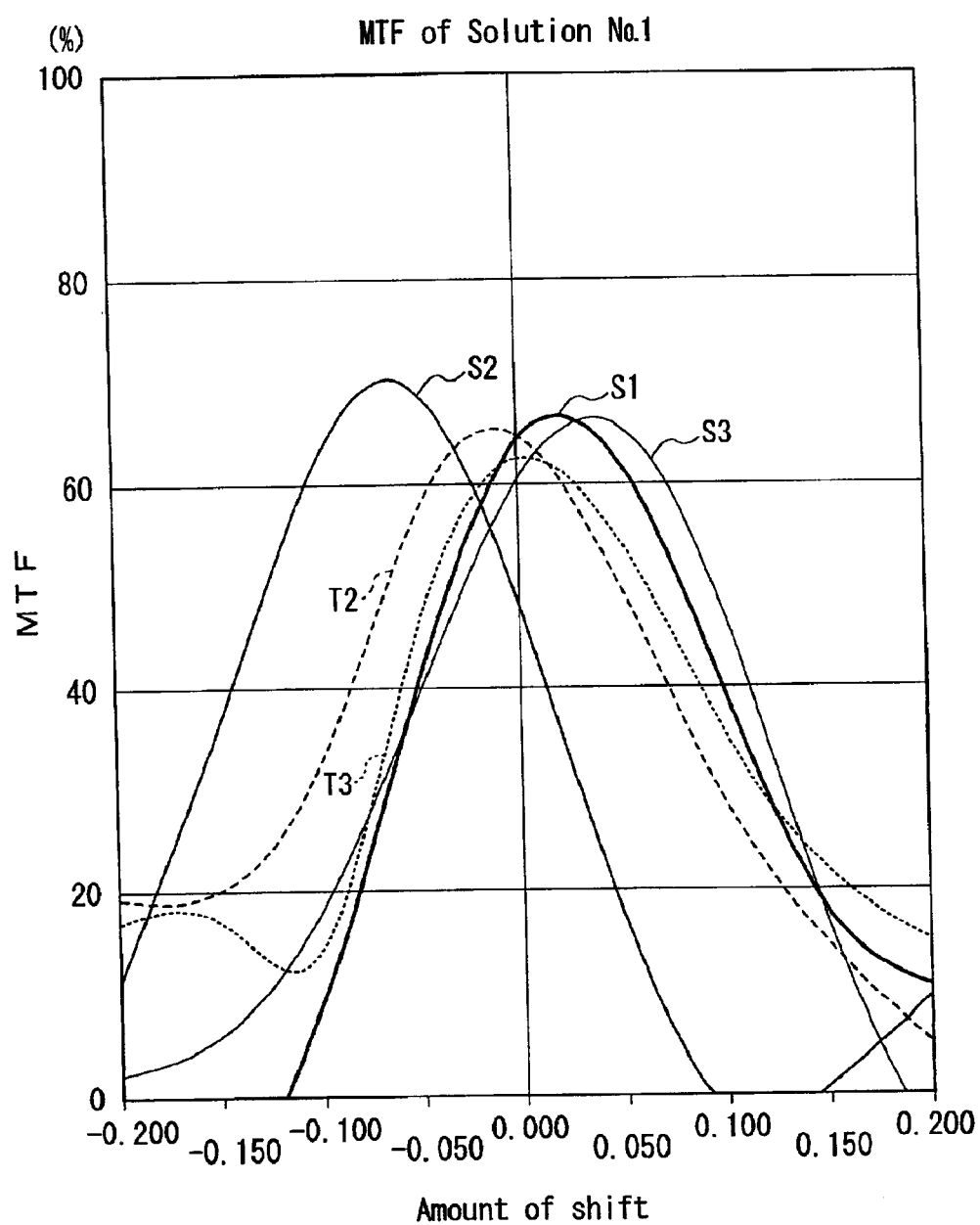
FIG. 26 is a graph showing MTF performance of the first solution in FIG. 19.
Figure 27:
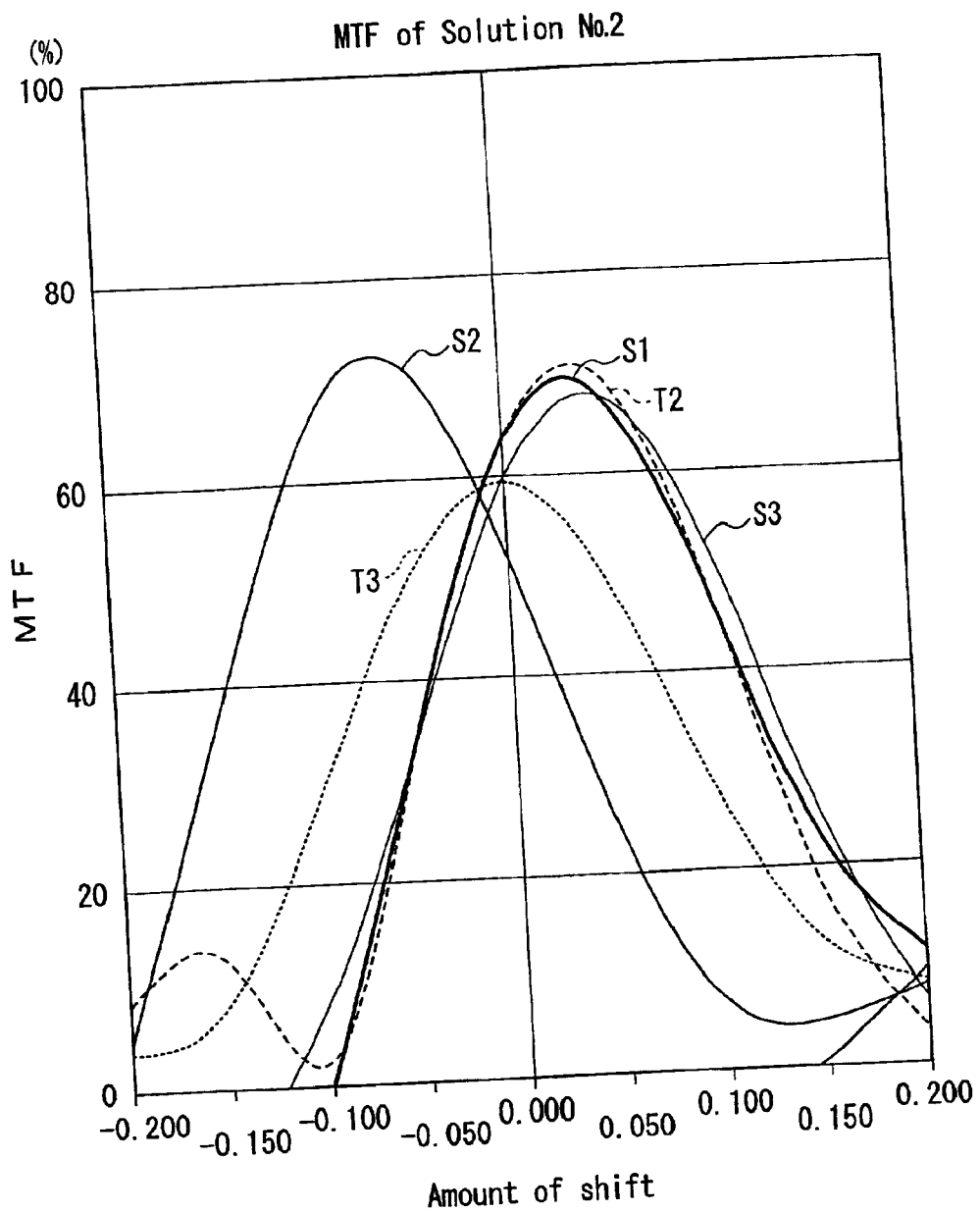
FIG. 27 is a graph showing MTF performance of the second solution in FIG. 19.
Figure 28:
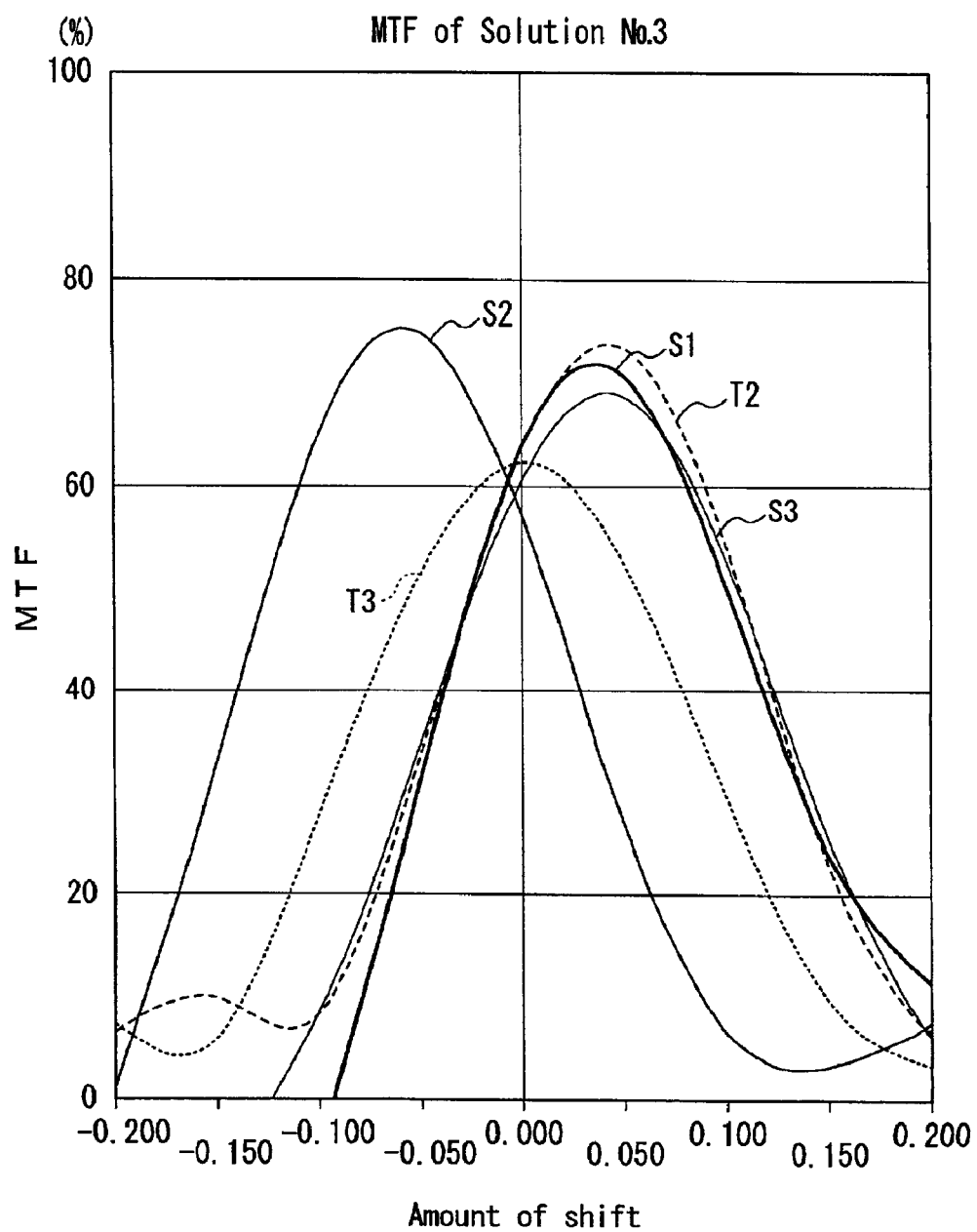
FIG. 28 is a graph showing MTF performance of the third solution in FIG. 19.
Figure 29:
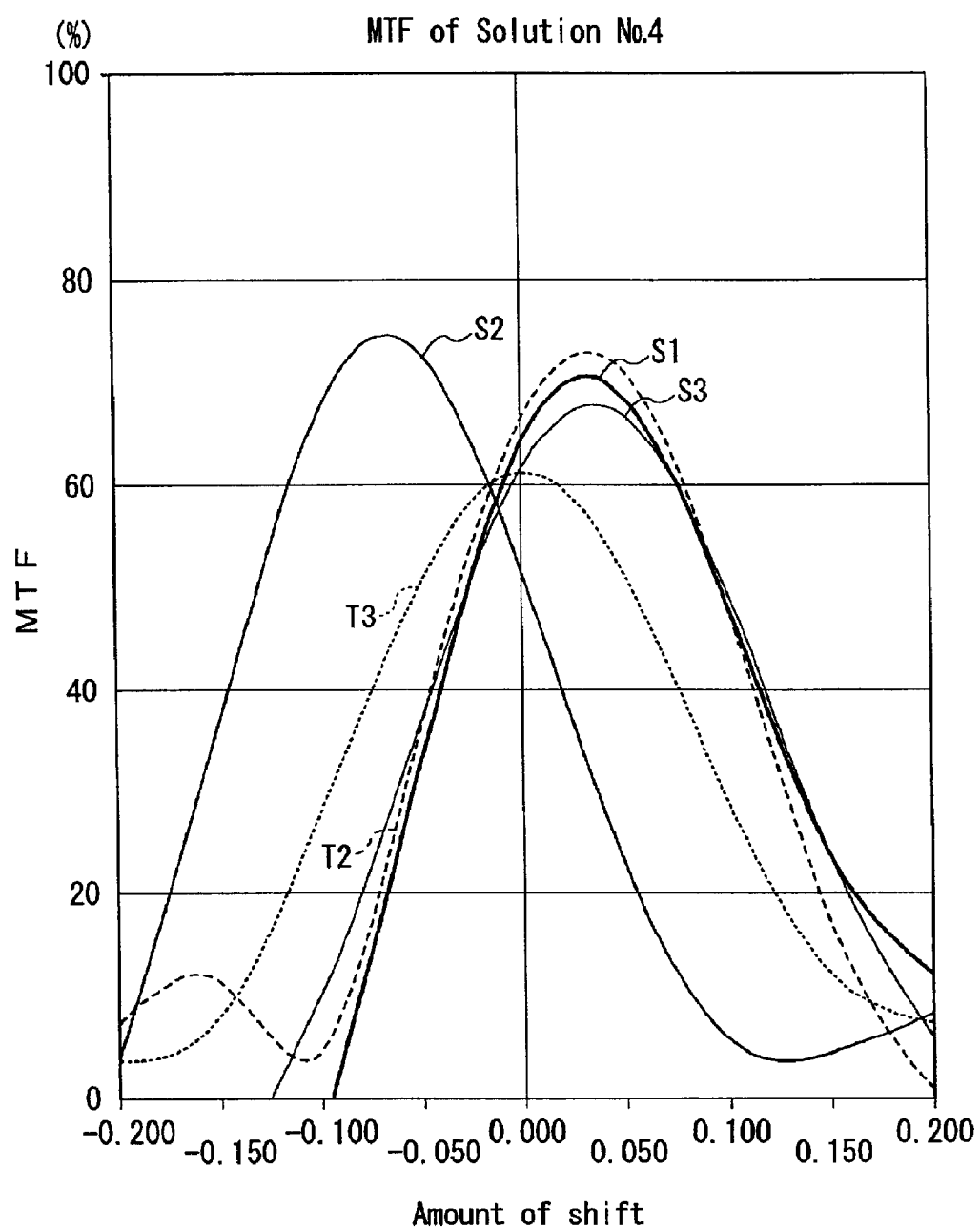
FIG. 29 is a graph showing MTF performance of the fourth solution in FIG. 19.
Figure 30:
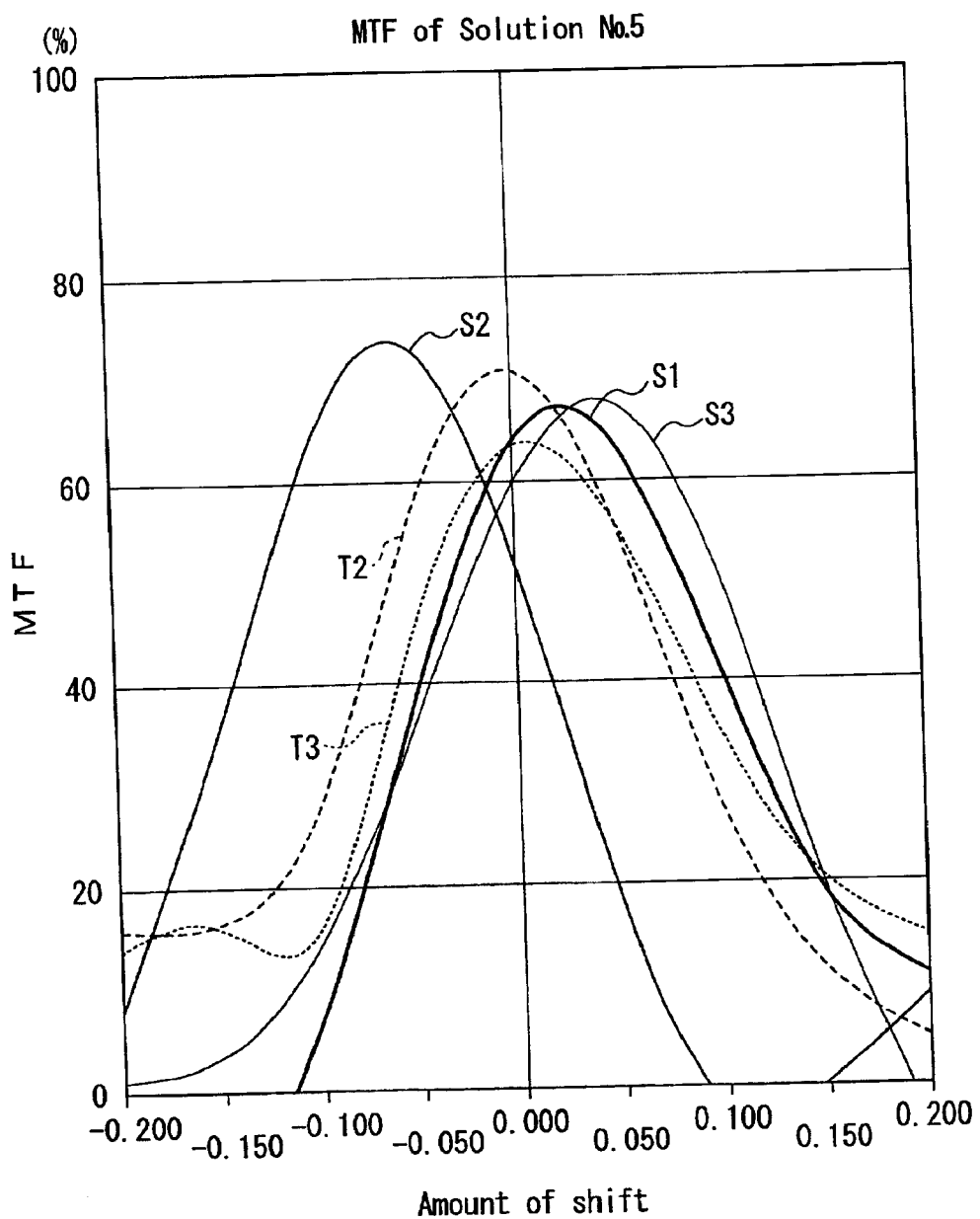
FIG. 30 is a graph showing MTF performance of the fifth solution in FIG. 19.

With reference to FIG. 17, a flow of an overall optimization process according to the embodiment will be described on the time order. FIG. 17 shows the optimization process using the method as in (i). In this embodiment, the optimization program for performing a process including each step shown in FIG. 17 is recorded on the hard disk drive 23 or recording medium 25 (FIG. 1) on the form of a program executable in a computer similar to the first embodiment, for example.

With the apparatus for optimizing an optical system, firstly the initial setting unit 31 (FIG. 2) performs input process of values for initial setting of various data required for optimization (Step S41). This input process corresponds to the process in Step S10 in FIG. 3, but the process of Step S41 further includes initial setting unique to the global optimization in addition to the initial setting (initial setting of data of components, setting of parameters for optimization or the like) performed in Step S10. The input process in Step S41 includes setting of the number of local minimums to be sought in the global optimization.

On the basis of the setting in Step 41, the first optimization unit 32 initiates the process of global optimization on aberration, seeking for local minimums (Step S42). Subsequently, the first optimization unit 32 judges whether the specified number of solutions of local minimums are obtained (Step S43). When the specified number of solutions for local minimums is not obtained (Step S43; N), a search for local minimums is performed again in Step S42.

Meanwhile, when the specified number of solutions are obtained Step S43; Y), MTF optimization is applied to all the local minimums obtained in the second optimization unit 33 (Step S44). On the other hand, only part of local minimums may be subject to MTF optimization, the part being selected considering the value of the merit function for aberration. Step S44 corresponds to Step S30 in FIG. 3. In Step S44, optimization process posterior to S30 is applied to each solution of all local minimums obtained (or a specific local minimum). Thus, a plurality of local minimums of the MTF is obtained. Thereafter, solutions of the plurality of local minimums of the MTF obtained are outputted by the output device 38. Among the solutions of the plurality of local minimums of the MTF, at least one solution in which the value of the merit function takes the minimum may be outputted with the merit function for the MTF as a criterion, for example.

In a case to perform the optimization process as in (ii), the optimization process of the MTF in Step S44 is performed after Step S42 in FIG. 17.

As has been described herein before, with the embodiment, optimization of the optical system is performed with the MTF performance as the final goal by combining the global optimization and the MTF optimization, whereby the global best solution with respect to the MTF performance can be efficiently obtained at high speed compared to the conventional method.

[Experimental Example 2]

An experimental example of lens optimization with actual numeric values using the method of optimizing an optical system and the apparatus for optimizing an optical method according to the embodiment.

With the experimental example, described is an example where the tessar type photographic lens shown in FIGS. 4 and 5 are subject to combination optimization of the global optimization and the MTF optimization. With the experimental example, similar to the first experimental example of the first embodiment above, optimization is performed under the design condition as in FIG. 6. In this experimental example, parameters are the radius of curvature $R_i$, the surface separation $D_i$, the refractive index $Nd_i$ and the Abbe's number $vd_i$ as in FIG. 5, and target values to be described below is used in the merit function.

The same merit function for aberration and the condition for constraint are used as those used in the first experimental example. Target values for the merit function for the MTF as shown in FIG. 18 are set. With the setting of the target values, the target value of the S direction at the field angel of 20 degrees is 60% which is 5% higher as compared to Target 1 as in FIG. 7. Other setting conditions are the same as those of Target 1 in FIG. 7.

FIG. 19 shows values of the merit function for the aberration and the MTF of the solutions of a plurality of local minimums obtained by optimization under the following condition. In FIG. 19, values of the merit functions for aberration are not the values after the MTF optimization but the values of local minimums obtained by the global optimization prior to the MTF optimization. With the experimental example, ten local minimums of aberration are automatically obtained by the global optimization. However, for facilitating descriptions, among the local minimums five solutions showing an apparently greater degree of aberration are eliminated and other five solutions (Solution number 1 to 5) are subject to MTF optimization. The table in FIG. 19 contains the values of these five solutions subject to the MTF optimization.

In FIG. 19 Solution number 1 is the local minimum which can be reached directly from the starting point of optimization, thus practically Solution number 2 to 5 are considered to be local minimums obtained by the global optimization. The smaller the value of the merit function is, the higher performance is. Thus, as apparent from FIG. 19, Solution number 3 is the best solution of the MTF. The lens data of this best solution is shown in FIG. 20. The same symbols as those in lens data in FIG. 5 are used in FIG. 20.

FIGS. 21 to 25 are illustrations of photographic lenses 1-1 to 1-5 corresponding to Solution number 1 to 5, respectively. The same symbols as those in FIG. 4 are used in FIGS. 21 to 25. FIGS. 26 to 30 show MTF performance of the photographic lenses 1-1 to 1-5. The same symbols as those in FIG. 14 are used in FIGS. 26 to 30.

As described above, with the experimental example more preferable optimization of the MTF is achieved compared to the conventional global optimization.

The invention is not limited to the above embodiments and various modifications are possible. For example, in the above embodiments described is the case where the MTF is used as the design objective. However, the invention can be widely applied to a case where optical properties expressed by values having high non-linearity with which long calculation time is required such as half-width of a point spread function are used as the design objective. The present invention can be applied to optical properties where the design objective can be expressed by values of a merit function on aberration such as RMS spot size. The function of adjusting weights for aberration for each sample object point so as to satisfy the target value for each sample object point is a new function and particular to this case. More generally, the invention is also applicable to a case such that other optical properties which need adjustment to weight for aberration with regard to each sample object point so as to satisfy the target value for each sample object point are used as the evaluation subject.

In the second embodiment, described is a case where after obtaining local minimums by global optimization, weights and target values for aberration are automatically adjusted in a manner that the evaluated value of the MTF approaches the desired value with respect to the obtained local minimums. However, calculation for optimization may be performed on the obtained local minimums directly using the MTF as the evaluation subject without performing automated adjustment to weights and target values for aberration.

According to the method of optimizing an optical system, the apparatus for optimizing an optical system and a recording medium on which an optimization program for an optical system is recorded of the invention, the function for optimization on the first optical property is automatically adjusted in a manner that the value of the second optical property approaches the desired target value of the second optical property on the basis of at least the evaluation result of the optical system on the second optical property, the second optical property having relatively high non-linearity with design parameters of the optical system compared to the first optical property, and then on the basis of this function automatically adjusted, the optical system which has been optimized is re-optimized. As a result, the function such as adjustment of weights and target values equivalent to the operation which has been conducted by a designer can be automated. Thus, optical properties having high non-linearity such as the MTF are efficiently optimized at high speed compared to the conventional method.

According to the method of optimizing an optical system of another aspect of the invention, the first function is automatically adjusted on each of the plurality of local optimal solutions obtained by global optimization. As a result, the global best solution is efficiently obtained at high speed compared to the conventional method.

Obviously many modifications and variations of the present invention are possible in the light of the above teachings. It is therefore to be understood that within the scope of the appended claims the invention may be practiced otherwise than as specifically described.

What is claimed is:

1. A method of optimizing an optical system, comprising the steps of:

optimizing an optical system as a subject of design by changing design parameters in a manner that a value of a first optical property approaches a target value on the basis of a first merit function for optimization in which the target value of the first optical property including at least an aberration is set;

automatically adjusting the first merit function in a manner that a value of a second optical property which is different from the first optical property approaches a desired target value of the second optical property on the basis of a second merit function for optimization in which the target value of the second optical property is set, after the optical system as a subject of design is evaluated while regarding the second optical property as a subject of evaluation; and re-optimizing the optical system, which has been optimized, on the basis of the first merit function automatically adjusted, wherein each of the first merit function and the second merit function is a sum total of functions represented by $w_i^*(f_i-t_i)^2$ of the first optical property or the second optical property (where '$f_i$' means an evaluated value of the $_i$th optical property included in the first or the second optical property (i represents an integer greater than or equal to 1); '$t_i$' means a target value of the $_i$th optical property; '$w_i$' means a weight value of the $_i$th optical property; and '*' means multiplication, in the step of optimizing the optical system, the design parameters are adjusted in a manner that the first merit function takes the minimum, and in the step of automatically adjusting the first merit function, the target value $t_i$ and the weight value $w_i$ of the first merit function are adjusted in a manner that the second merit function takes the minimum.

2. A method of optimizing an optical system according to claim 1, further comprising a step of evaluating the optical system as a subject of design on the first optical property prior to the step of optimizing the optical system, wherein in the step of optimizing the optical system, optimization of the optical system is performed on the basis of the first evaluation result an the first merit function.

3. A method of optimizing an optical system according to claim 1, wherein when the first optical property includes a plurality of optical properties in the first merit function, each of the first optical properties has a weight.

4. A method of optimizing an optical system according to claim 1, wherein the second optical property includes a modulation transfer function.

5. A method of optimizing an optical system according to claim 1, wherein, in the first merit function, the first optical properties are considered on each of a plurality of sample object points set in different positions, each of the first optical properties of the plurality of sample object points has a relative weight, and the automated adjustment of the first merit function includes a process of relatively adjusting the values of the weights.

6. A method of optimizing an optical system according to claim 5, wherein the first optical properties on the plurality of sample object points include optical properties for each of two coordinate components on each sample object point, the two coordinate components being orthogonal to each other, and the automated adjustment of the first merit function includes a process of adjusting the values of the weights for each of the two coordinate components.

7. A method of optimizing an optical system according to claim 1, wherein in the first merit function, the first optical properties are considered on each of a plurality of different sample rays from one sample object point, each of the first optical properties of the plurality of different sample rays has a relative weight, and the automated adjustment of the first merit function includes a process of relatively adjusting the values of the weights.

8. A method of optimizing an optical system according to claim 7, wherein the first optical properties on the plurality of different sample rays include optical properties for each of two coordinate components on each sample ray, the two coordinate components being orthogonal to each other, and the automated adjustment of the first merit function includes a process of adjusting the values of the weights for each of two coordinate components.

9. A method of optimizing an optical system according to claim 1, wherein the second optical properties include a modulation transfer function, the first optical properties include an optical property for controlling a peak position, the optical property contributing to a peak position control of the modulation transfer function, and the automated adjustment of the first merit function includes a process of adjusting a function on the optical property for controlling the peak position in a manner that the modulation transfer function approaches a desired target value.

10. A method of optimizing an optical system according to claim 9, wherein the function on the optical property for controlling the peak position includes a function for curvature of field on a principal ray.

11. A method of optimizing an optical system according to claim 9, wherein the function on the optical property for controlling the peak position includes a function describing the mean of longitudinal aberrations.

12. A method of optimizing an optical system according to claim 9, wherein the function on the optical property for controlling the peak position includes a function describing the minimum of square spot size.

13. A method of optimizing an optical system according to claim 1, wherein in the step of optimizing an optical system, a plurality of local optimal solutions is obtained by performing global optimization, in the step of automatically adjusting the first merit function, evaluation of each of one or more of optical systems described by the plurality of local optimal solutions is performed on the second optical properties on the basis of a result of the evaluation and then the first merit function is automatically adjusted for each of the one or more of the optical system in a manner that the value of the second optical property approaches a desired target value, and in the step of re-performing optimization, each of the one or more of the optical systems is re-optimized.

14. An apparatus for optimizing an optical system, comprising:

optimization means for optimizing an optical system as a subject of design by changing design parameters in a manner that a value of a first optical property approaches a target value, on the basis of a first merit function for optimization in which a target value of the first optical property including at least an aberration is set;

adjusting means for automatically adjusting the first merit function for optimization in a manner that a value of second optical property which is different from the first optical property approaches a desired target value of the second optical property on the basis of a second merit function for optimization in which the target value of the second optical property is set, after the optical system as a subject of design is evaluated while regarding the second optical property as a subject of evaluation; and control means for controlling the optimization means in a manner that re-optimization is performed on the optical system which has been optimized on the basis of the first merit function for optimization automatically adjusted, wherein each of the first merit function and the second merit function is a sum total of functions represented by $w_i^*(f_i-t_i)^2$ of the first optical property or the second optical property (where '$f_i$' means an evaluated value of the $i$th optical property included in the first or the second optical property (i represents an integer greater than or equal to 1); '$t_i$' means a target value of the $i$th optical property; '$w_i$' means a weight value of the $i$th optical property; and '*' means multiplication, in the optimization means, the design parameters are adjusted in a manner that the first merit function takes the minimum, and in the adjusting means, the target value $t_i$ and the weight value $w_i$ of the first merit function are adjusted in a manner that the second merit function takes the minimum.

15. An apparatus for optimizing an optical system according to claim 14, further comprising first evaluation means for evaluating the optical system as a subject of design on the first optical property prior to the optimization by the optimization means, wherein the optimization means performs optimization of the optical system on the basis of the first evaluation result and the first merit function for optimization.

16. A recording medium, wherein an optimization program for an optical system executable in a computer is recorded, the optimization program comprising the steps of:

optimizing the optical system as a subject of design by changing design parameters in a manner that a value of a first optical property approaches a target value on the basis of a first merit function for optimization in which the target value for the first optical property including at least an aberration is set;

automatically adjusting the first merit function for optimization in a manner that a value of second optical property which is different from the first optical property approaches a desired target value of the second optical property on the basis of a second merit function for optimization in which the target value of the second optical property is set, after the optical system as a subject of design is evaluated while regarding the second optical property as a subject of evaluation; and re-optimizing the optical system, which has been optimized, on the basis of the first merit function automatically adjusted, wherein each of the first merit function and the second merit function is a sum total of functions represented by $w_i*(f_i-t_i)^2$ of the first optical property or the second optical property (where '$f_i$' means an evaluated value of the $_i$th optical property included in the first or the second optical property (i represents an integer greater than or equal to 1): '$t_i$' means a target value of the $_i$th optical property; '$w_i$' means a weight value of the $_i$th optical property; and '*' means multiplication, in the step of optimizing the optical system, the design parameters are adjusted in a manner that the first merit function takes the minimum, and in the step of automatically adjusting the first merit function, the target value $t_i$ and the weight value $w_i$ of the first merit function are adjusted in a manner that the second merit function takes minimum.

17. A recording medium according to claim 16, in which the optimization program is recorded, the recording medium further comprising a step of evaluating the optical system as a subject of design on the first optical properties prior to the step of optimizing the optical system, wherein the optimization of the optical system is performed on the basis of the first evaluation result and the first merit function in the step of optimizing the optical system.

* * * * *